US008847571B2

(12) United States Patent
Kielb

(10) Patent No.: US 8,847,571 B2
(45) Date of Patent: Sep. 30, 2014

(54) RF ADAPTER FOR FIELD DEVICE WITH VARIABLE VOLTAGE DROP

(75) Inventor: John A. Kielb, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 857 days.

(21) Appl. No.: 12/486,282

(22) Filed: Jun. 17, 2009

(65) Prior Publication Data

US 2009/0309558 A1   Dec. 17, 2009

Related U.S. Application Data

(60) Provisional application No. 61/073,096, filed on Jun. 17, 2008.

(51) Int. Cl.
| G05F 1/613 | (2006.01) |
| G05F 3/16 | (2006.01) |
| G05F 1/00 | (2006.01) |
| G05B 23/02 | (2006.01) |
| G05B 19/042 | (2006.01) |

(52) U.S. Cl.
CPC .. *G05B 19/0423* (2013.01); *G05B 2219/25187* (2013.01); *G05B 2219/25428* (2013.01)
USPC ............. 323/303; 323/224; 323/266; 340/3.9

(58) Field of Classification Search
USPC ............................. 323/224, 266, 303; 340/3.9
See application file for complete search history.

(56) References Cited

U.S. PATENT DOCUMENTS

| 2,533,339 | A | 12/1950 | Willenborg | 177/311 |
| 2,640,667 | A | 6/1953 | Winn | 248/65 |
| 2,883,489 | A | 4/1959 | Eadie, Jr. et al. | 335/148 |
| 3,012,432 | A | 12/1961 | Moore et al. | 73/40 |
| 3,218,863 | A | 11/1965 | Calvert | 73/398 |
| 3,229,759 | A | 1/1966 | Grover et al. | 165/105 |
| 3,232,712 | A | 2/1966 | Stearns | 23/255 |
| 3,249,833 | A | 5/1966 | Vosteen | 317/246 |
| 3,374,112 | A | 3/1968 | Danon | 117/226 |
| 3,557,621 | A | 1/1971 | Ferran | 73/398 |

(Continued)

FOREIGN PATENT DOCUMENTS

| CH | 672 368 A5 | 11/1989 |
| CN | 06 199284 A | 7/1994 |

(Continued)

OTHER PUBLICATIONS

XP 002400076

(Continued)

*Primary Examiner* — Adolf Berhane
*Assistant Examiner* — Gary Nash
(74) *Attorney, Agent, or Firm* — Westman, Champlin & Koehler, P.A.

(57) ABSTRACT

A wireless adapter for use in a two-wire process control loop includes wireless communication circuitry and first and second terminals configured to couple in series with the two-wire process control loop. A regulator having a regulated input is coupled to the first terminal and an output. A shunt is coupled to the output of the regulator and is configured to provide power to the wireless communication circuitry. A feedback circuit is configured to control current flowing from the regulator to the shunt as a function of a loop current flowing through the two-wire process control loop.

21 Claims, 8 Drawing Sheets

(56) References Cited

U.S. PATENT DOCUMENTS

| | | | | |
|---|---|---|---|---|
| 3,568,762 | A | 3/1971 | Harbaugh | 165/105 |
| 3,612,851 | A | 10/1971 | Fowler | 362/30 |
| 3,631,264 | A | 12/1971 | Morgan | 327/309 |
| 3,633,053 | A | 1/1972 | Peters et al. | 310/15 |
| 3,697,835 | A | 10/1972 | Satori | 317/246 |
| D225,743 | S | 1/1973 | Seltzer | D10/102 |
| 3,742,450 | A | 6/1973 | Weller | 375/257 |
| 3,808,480 | A | 4/1974 | Johnston | 317/256 |
| 3,881,962 | A | 5/1975 | Rubinstein | 136/209 |
| 3,885,432 | A | 5/1975 | Herzl | 73/861.22 |
| 3,924,219 | A | 12/1975 | Braun | 338/34 |
| 3,931,532 | A | 1/1976 | Byrd | 310/4 |
| 4,005,319 | A | 1/1977 | Nilsson et al. | 310/8.3 |
| 4,008,619 | A | 2/1977 | Alcaide et al. | 73/398 |
| 4,042,757 | A | 8/1977 | Jones | 429/104 |
| 4,063,349 | A | 12/1977 | Passler et al. | 29/627 |
| 4,084,155 | A | 4/1978 | Herzl et al. | 340/870.39 |
| 4,116,060 | A | 9/1978 | Frederick | 73/861.22 |
| 4,125,122 | A | 11/1978 | Stachurski | 136/205 |
| 4,158,217 | A | 6/1979 | Bell | 361/283 |
| 4,168,518 | A | 9/1979 | Lee | 361/283 |
| 4,177,496 | A | 12/1979 | Bell et al. | 361/283 |
| 4,227,419 | A | 10/1980 | Park | 73/724 |
| 4,287,553 | A | 9/1981 | Braunlich | 361/283 |
| 4,295,179 | A | 10/1981 | Read | 361/600 |
| 4,322,724 | A | 3/1982 | Grudzinski | 340/595 |
| 4,322,775 | A | 3/1982 | Delatorre | 361/283 |
| 4,336,567 | A | 6/1982 | Anastasia | 361/283 |
| 4,358,814 | A | 11/1982 | Lee et al. | 361/283 |
| 4,361,045 | A | 11/1982 | Iwasaki | 73/654 |
| 4,370,890 | A | 2/1983 | Frick | 73/718 |
| 4,383,801 | A | 5/1983 | Pryor | 416/17 |
| 4,389,895 | A | 6/1983 | Rud, Jr. | 73/724 |
| 4,390,321 | A | 6/1983 | Langlois et al. | 417/15 |
| 4,422,125 | A | 12/1983 | Antonazzi et al. | 361/283 |
| 4,422,335 | A | 12/1983 | Ohnesorge et al. | 73/724 |
| 4,434,451 | A | 2/1984 | Delatorre | 361/283 |
| 4,455,874 | A | 6/1984 | Paros | 73/704 |
| 4,458,537 | A | 7/1984 | Bell et al. | 73/718 |
| 4,459,537 | A * | 7/1984 | McWhorter | 323/224 |
| 4,475,047 | A | 10/1984 | Ebert | 307/66 |
| 4,476,853 | A | 10/1984 | Arbogast | 126/578 |
| 4,485,670 | A | 12/1984 | Camarda et al. | 73/179 |
| 4,490,773 | A | 12/1984 | Moffatt | 361/283 |
| 4,510,400 | A | 4/1985 | Kiteley | 307/66 |
| 4,542,436 | A | 9/1985 | Carusillo | 361/283 |
| 4,562,742 | A | 1/1986 | Bell | 73/718 |
| 4,570,217 | A | 2/1986 | Allen et al. | 700/19 |
| 4,590,466 | A | 5/1986 | Wiklund et al. | 340/870.28 |
| 4,639,542 | A | 1/1987 | Bass et al. | 136/210 |
| 4,670,733 | A | 6/1987 | Bell | 338/36 |
| 4,701,938 | A | 10/1987 | Bell | 375/257 |
| 4,704,607 | A | 11/1987 | Teather et al. | 340/825.07 |
| 4,749,993 | A | 6/1988 | Szabo et al. | 340/870.31 |
| 4,785,669 | A | 11/1988 | Benson et al. | 73/718 |
| 4,860,232 | A | 8/1989 | Lee et al. | 364/571.04 |
| 4,875,369 | A | 10/1989 | Delatorre | 73/151 |
| 4,878,012 | A | 10/1989 | Schulte et al. | 324/60 |
| 4,926,674 | A | 5/1990 | Fossum et al. | 73/4 |
| 4,951,174 | A | 8/1990 | Grantham et al. | 361/283.1 |
| 4,977,480 | A | 12/1990 | Nishihara | 73/724 |
| 4,982,412 | A | 1/1991 | Gross | 377/6 |
| 5,009,311 | A | 4/1991 | Schenk | 206/332 |
| 5,014,176 | A | 5/1991 | Kelleher et al. | 363/26 |
| 5,023,746 | A | 6/1991 | Epstein | 361/56 |
| 5,025,202 | A | 6/1991 | Ishii et al. | 220/101 |
| 5,045,963 | A | 9/1991 | Hansen et al. | 361/87 |
| 5,060,295 | A | 10/1991 | Borras et al. | 455/186 |
| 5,079,562 | A | 1/1992 | Yarsunas et al. | 343/792 |
| 5,094,109 | A | 3/1992 | Dean et al. | 73/718 |
| D331,370 | S | 12/1992 | Williams | D10/46 |
| 5,168,419 | A | 12/1992 | Delatorre | 361/283 |
| 5,170,671 | A | 12/1992 | Miau et al. | 73/861.22 |
| 5,194,819 | A | 3/1993 | Briefer | 73/718 |
| 5,223,763 | A | 6/1993 | Chang | 310/339 |
| 5,230,250 | A | 7/1993 | Delatorre | 73/733 |
| 5,233,875 | A | 8/1993 | Obermeier et al. | 73/718 |
| D345,107 | S | 3/1994 | Williams | D10/46 |
| 5,313,831 | A | 5/1994 | Beckman | 73/204.24 |
| 5,329,818 | A | 7/1994 | Frick et al. | 73/708 |
| 5,412,535 | A | 5/1995 | Chao et al. | 361/700 |
| 5,492,016 | A | 2/1996 | Pinto et al. | 73/724 |
| 5,495,769 | A | 3/1996 | Broden et al. | 73/18 |
| 5,506,757 | A | 4/1996 | Brorby | 361/796 |
| 5,531,936 | A | 7/1996 | Kanatzidis et al. | 252/587 |
| 5,542,300 | A | 8/1996 | Lee | 73/724 |
| 5,546,804 | A | 8/1996 | Johnson et al. | 73/431 |
| 5,554,809 | A | 9/1996 | Tobita et al. | 73/700 |
| 5,554,922 | A | 9/1996 | Kunkel | 322/3 |
| 5,599,172 | A | 2/1997 | McCabe | 417/334 |
| 5,606,513 | A | 2/1997 | Louwagie et al. | 702/138 |
| 5,610,552 | A | 3/1997 | Schlesinger et al. | 327/560 |
| 5,614,128 | A | 3/1997 | Kanatzidis et al. | 252/582 |
| 5,618,471 | A | 4/1997 | Kanatzidis et al. | 252/582 |
| 5,637,802 | A | 6/1997 | Frick et al. | 73/724 |
| 5,642,301 | A | 6/1997 | Warrior et al. | 364/571.02 |
| 5,644,185 | A | 7/1997 | Miller | 310/306 |
| 5,656,782 | A | 8/1997 | Powell, II et al. | 73/756 |
| 5,665,899 | A | 9/1997 | Willcox | 731/1.63 |
| 5,672,832 | A | 9/1997 | Cucci et al. | 73/861.52 |
| 5,682,476 | A | 10/1997 | Tapperson et al. | 395/200.05 |
| 5,705,978 | A | 1/1998 | Frick et al. | 340/511 |
| 5,710,552 | A | 1/1998 | McCoy et al. | 340/870.21 |
| 5,722,249 | A | 3/1998 | Miller, Jr. | 62/238.2 |
| 5,726,845 | A * | 3/1998 | Ho | 361/86 |
| 5,726,846 | A | 3/1998 | Houbre | 361/93 |
| 5,754,419 | A * | 5/1998 | Ho | 363/89 |
| 5,757,608 | A | 5/1998 | Bernot et al. | 361/283.4 |
| 5,764,891 | A | 6/1998 | Warrior | 710/72 |
| 5,787,120 | A | 7/1998 | Louagie et al. | 375/257 |
| 5,793,963 | A | 8/1998 | Tapperson et al. | 395/200.31 |
| 5,803,604 | A | 9/1998 | Pompei | 374/181 |
| 5,811,201 | A | 9/1998 | Skowronski | 429/17 |
| 5,851,083 | A | 12/1998 | Palan | 403/337 |
| 5,870,695 | A | 2/1999 | Brown et al. | 702/138 |
| 5,872,494 | A | 2/1999 | Palan et al. | 333/252 |
| 5,899,962 | A | 5/1999 | Louwagie et al. | 702/138 |
| 5,911,162 | A | 6/1999 | Denner | 73/718 |
| 5,929,372 | A | 7/1999 | Oudoire et al. | 136/208 |
| 5,954,526 | A | 9/1999 | Smith | 439/136 |
| 5,957,727 | A | 9/1999 | Page, Jr. | 439/607.58 |
| 5,978,658 | A | 11/1999 | Shoji | 455/66 |
| 5,992,240 | A | 11/1999 | Tsuruoka et al. | 73/718 |
| 6,013,204 | A | 1/2000 | Kanatzidis et al. | 252/584 |
| 6,038,927 | A | 3/2000 | Karas | 73/706 |
| 6,062,095 | A | 5/2000 | Mulrooney et al. | 73/866.5 |
| 6,079,276 | A | 6/2000 | Frick et al. | 73/18 |
| 6,104,759 | A | 8/2000 | Carkner et al. | 375/295 |
| 6,109,979 | A | 8/2000 | Garnett | 439/709 |
| 6,126,327 | A | 10/2000 | Bi et al. | 709/221 |
| 6,127,739 | A | 10/2000 | Appa | 290/55 |
| 6,150,798 | A | 11/2000 | Ferry et al. | 323/273 |
| D439,177 | S | 3/2001 | Fandrey et al. | D10/46 |
| D439,178 | S | 3/2001 | Fandrey et al. | D10/46 |
| D439,179 | S | 3/2001 | Fandrey et al. | D10/46 |
| D439,180 | S | 3/2001 | Fandrey et al. | D10/85 |
| D439,181 | S | 3/2001 | Fandrey et al. | D10/46 |
| D441,672 | S | 5/2001 | Fandrey et al. | D10/52 |
| 6,236,096 | B1 | 5/2001 | Chang et al. | 257/419 |
| 6,236,334 | B1 | 5/2001 | Tapperson et al. | 340/825 |
| 6,255,010 | B1 | 7/2001 | George et al. | 429/30 |
| 6,282,247 | B1 | 8/2001 | Shen | 375/285 |
| 6,295,875 | B1 | 10/2001 | Frick et al. | 73/718 |
| 6,312,617 | B1 | 11/2001 | Kanatzidis et al. | 252/62.3 |
| 6,326,764 | B1 | 12/2001 | Virtudes | 320/101 |
| 6,338,283 | B1 | 1/2002 | Blazquez Navarro | 73/865.8 |
| 6,360,277 | B1 | 3/2002 | Ruckley et al. | 709/250 |
| 6,366,436 | B1 | 4/2002 | Maier et al. | 361/93.9 |
| 6,385,972 | B1 | 5/2002 | Fellows | 60/517 |
| 6,405,139 | B1 | 6/2002 | Kicinski et al. | 702/33 |
| 6,429,786 | B1 | 8/2002 | Bansemir et al. | 340/870.27 |
| 6,441,747 | B1 | 8/2002 | Khair et al. | 340/870.16 |
| 6,457,367 | B1 | 10/2002 | Behm et al. | 73/753 |
| 6,480,699 | B1 | 11/2002 | Lovoi | 455/41.2 |

(56) References Cited

U.S. PATENT DOCUMENTS

| | | |
|---|---|---|
| 6,484,107 B1 | 11/2002 | Roper et al. .................. 702/50 |
| 6,487,912 B1 | 12/2002 | Behm et al. ..................... 73/753 |
| 6,504,489 B1 | 1/2003 | Westfield et al. .......... 340/870.3 |
| 6,508,131 B2 | 1/2003 | Frick .............................. 73/756 |
| 6,510,740 B1 | 1/2003 | Behm et al. ..................... 73/708 |
| 6,511,337 B1 | 1/2003 | Fandrey et al. ............... 439/320 |
| D471,829 S | 3/2003 | Dennis et al. ................. D10/85 |
| D472,831 S | 4/2003 | Dennis et al. ................. D10/85 |
| 6,546,805 B2 | 4/2003 | Fandrey et al. ................. 73/753 |
| 6,553,076 B1 | 4/2003 | Huang ......................... 375/257 |
| 6,563,908 B1 | 5/2003 | Enck, Jr. ...................... 378/123 |
| 6,568,279 B2 | 5/2003 | Behm et al. ..................... 73/753 |
| 6,571,132 B1 | 5/2003 | Davis et al. ...................... 700/2 |
| 6,574,515 B1 | 6/2003 | Kirkpatrick et al. ............. 700/19 |
| 6,593,857 B1 | 7/2003 | Roper et al. ............... 340/870.3 |
| 6,609,427 B1 | 8/2003 | Schnaare et al. ................ 73/753 |
| 6,640,308 B1 | 10/2003 | Keyghobad et al. .......... 713/300 |
| 6,661,220 B1 | 12/2003 | Glehr ....................... 324/207.17 |
| 6,662,662 B1 | 12/2003 | Nord et al. ..................... 73/715 |
| 6,667,594 B2 | 12/2003 | Chian ........................... 318/696 |
| 6,680,690 B1 | 1/2004 | Nilsson et al. ................ 342/124 |
| 6,690,182 B2 | 2/2004 | Kelly et al. .................... 324/700 |
| 6,711,446 B2 | 3/2004 | Kirkpatrick et al. ............. 700/19 |
| 6,747,573 B1 | 6/2004 | Gerlach et al. ........... 340/870.21 |
| 6,765,968 B1 | 7/2004 | Nelson et al. ................. 375/257 |
| 6,771,560 B2 | 8/2004 | Lyon et al. ...................... 367/13 |
| 6,774,814 B2 | 8/2004 | Hilleary .................. 340/870.07 |
| 6,778,100 B2 | 8/2004 | Schempf ................. 340/870.07 |
| 6,792,259 B1 | 9/2004 | Parise ....................... 455/343.1 |
| 6,823,072 B1 | 11/2004 | Hoover ............................. 381/7 |
| 6,838,859 B2 | 1/2005 | Shah ............................. 322/38 |
| 6,839,546 B2 | 1/2005 | Hedtke ..................... 455/67.11 |
| 6,839,790 B2 | 1/2005 | Barros De Almeida et al. .............................. 710/305 |
| 6,843,110 B2 | 1/2005 | Deane et al. ............... 73/114.35 |
| 6,891,477 B2 | 5/2005 | Aronstam ................... 340/606 |
| 6,891,838 B1 | 5/2005 | Petite et al. ................... 370/401 |
| 6,898,980 B2 | 5/2005 | Behm et al. .................... 73/756 |
| 6,904,295 B2 | 6/2005 | Yang ............................ 455/522 |
| 6,907,383 B2 | 6/2005 | Eryurek et al. .............. 702/183 |
| 6,910,332 B2 | 6/2005 | Fellows ......................... 60/520 |
| 6,942,728 B2 | 9/2005 | Caillat et al. ..................... 117/3 |
| 6,961,665 B2 | 11/2005 | Slezak ........................... 702/61 |
| 6,984,899 B1 | 1/2006 | Rice ............................... 290/44 |
| 6,995,677 B2 | 2/2006 | Aronstam et al. ........... 340/606 |
| 6,995,685 B2 | 2/2006 | Randall .................... 340/870.39 |
| 7,010,294 B1 | 3/2006 | Pyotsia et al. ................ 455/420 |
| 7,036,983 B2 | 5/2006 | Green et al. ................... 374/179 |
| 7,043,250 B1 | 5/2006 | DeMartino ................... 455/445 |
| 7,058,542 B2 | 6/2006 | Hauhia et al. ................. 702/183 |
| 7,073,394 B2 | 7/2006 | Foster ........................ 73/861.22 |
| 7,088,285 B2 | 8/2006 | Smith ........................... 342/124 |
| 7,109,883 B2 | 9/2006 | Trimble et al. .......... 340/870.16 |
| 7,116,036 B2 | 10/2006 | Balasubramaniam et al. .............................. 310/322 |
| 7,129,663 B2 * | 10/2006 | Suzuki .......................... 318/504 |
| 7,136,725 B1 | 11/2006 | Paciorek et al. .............. 700/295 |
| 7,173,343 B2 | 2/2007 | Kugel .......................... 290/1 R |
| 7,197,953 B2 | 4/2007 | Olin ............................. 73/866.5 |
| 7,233,745 B2 | 6/2007 | Loechner ..................... 398/128 |
| 7,262,693 B2 | 8/2007 | Karschnia et al. ............ 340/508 |
| 7,271,679 B2 | 9/2007 | Lundberg et al. ............... 333/24 |
| 7,301,454 B2 | 11/2007 | Seyfang et al. .......... 340/539.26 |
| 7,319,191 B2 | 1/2008 | Poon et al. .................. 174/50.62 |
| 7,329,959 B2 | 2/2008 | Kim et al. ........................ 290/2 |
| 7,351,098 B2 | 4/2008 | Gladd et al. .................. 439/578 |
| 7,518,553 B2 | 4/2009 | Zhang et al. ........... 343/700 MS |
| 7,539,593 B2 | 5/2009 | Machacek .................... 702/127 |
| 7,560,907 B2 | 7/2009 | Nelson ........................... 322/37 |
| 7,626,141 B2 | 12/2009 | Rodriguez-Medina et al. .............................. 219/260 |
| 7,726,017 B2 | 6/2010 | Evans et al. ..................... 29/854 |
| 7,835,119 B2 * | 11/2010 | Florence et al. ................ 361/18 |
| 7,983,049 B2 | 7/2011 | Leifer et al. .................. 361/728 |
| 8,005,514 B2 | 8/2011 | Saito et al. .................... 455/572 |
| 8,150,462 B2 | 4/2012 | Guenter et al. ............... 455/557 |
| 2001/0025349 A1 | 9/2001 | Sharood et al. .............. 713/340 |
| 2002/0011115 A1 | 1/2002 | Frick .............................. 73/718 |
| 2002/0029130 A1 | 3/2002 | Eryurek et al. .............. 702/183 |
| 2002/0065631 A1 | 5/2002 | Loechner ..................... 702/188 |
| 2002/0082799 A1 | 6/2002 | Pramanik ..................... 702/130 |
| 2002/0095520 A1 | 7/2002 | Wettstein et al. ............. 709/253 |
| 2002/0097031 A1 | 7/2002 | Cook et al. ................... 323/273 |
| 2002/0105968 A1 | 8/2002 | Pruzan et al. ................. 370/465 |
| 2002/0148236 A1 | 10/2002 | Bell ................................ 62/3.3 |
| 2002/0163323 A1 | 11/2002 | Kasai et al. ................... 323/284 |
| 2003/0032993 A1 | 2/2003 | Mickle et al. ................ 600/509 |
| 2003/0042740 A1 | 3/2003 | Holder et al. ................. 290/1 A |
| 2003/0043052 A1 | 3/2003 | Tapperson et al. ........ 640/825.37 |
| 2003/0079553 A1 | 5/2003 | Cain et al. ................. 73/861.27 |
| 2003/0083038 A1 | 5/2003 | Poon et al. .................... 455/344 |
| 2003/0097521 A1 | 5/2003 | Pfandler et al. ............... 711/103 |
| 2003/0134161 A1 | 7/2003 | Gore et al. ..................... 429/12 |
| 2003/0143958 A1 | 7/2003 | Elias et al. ....................... 455/73 |
| 2003/0167631 A1 | 9/2003 | Hallenbeck .................... 29/835 |
| 2003/0171827 A1 | 9/2003 | Keyes, IV et al. .............. 700/19 |
| 2003/0199778 A1 | 10/2003 | Mickle et al. ................ 600/509 |
| 2003/0204371 A1 | 10/2003 | Sciamanna .................. 702/183 |
| 2004/0081872 A1 | 4/2004 | Herman et al. ................. 429/26 |
| 2004/0085240 A1 | 5/2004 | Faust ........................... 342/124 |
| 2004/0086021 A1 | 5/2004 | Litwin .......................... 374/120 |
| 2004/0124854 A1 | 7/2004 | Slezak .......................... 324/644 |
| 2004/0142733 A1 | 7/2004 | Parise .......................... 455/572 |
| 2004/0159235 A1 | 8/2004 | Marganski et al. ............. 95/116 |
| 2004/0183550 A1 | 9/2004 | Fehrenbach et al. ............. 27/26 |
| 2004/0184517 A1 | 9/2004 | Westfield et al. ............. 375/219 |
| 2004/0199681 A1 | 10/2004 | Hedtke ........................... 710/37 |
| 2004/0200519 A1 | 10/2004 | Sterzel et al. ................. 136/238 |
| 2004/0203434 A1 | 10/2004 | Karschnia et al. .......... 455/67.11 |
| 2004/0211456 A1 | 10/2004 | Brown et al. ................. 136/243 |
| 2004/0214543 A1 | 10/2004 | Osone et al. ................ 455/197.2 |
| 2004/0218326 A1 | 11/2004 | Duren et al. ................. 361/93.1 |
| 2004/0242169 A1 | 12/2004 | Albsmeier et al. .............. 455/91 |
| 2004/0249483 A1 | 12/2004 | Wojsznis et al. ............... 700/52 |
| 2004/0259533 A1 | 12/2004 | Nixon et al. ................. 455/414.1 |
| 2005/0011278 A1 * | 1/2005 | Brown et al. ............. 73/861.18 |
| 2005/0017602 A1 | 1/2005 | Arms et al. ................... 310/339 |
| 2005/0023858 A1 | 2/2005 | Bingle et al. ................... 296/76 |
| 2005/0029236 A1 | 2/2005 | Gambino et al. ........ 219/121.69 |
| 2005/0040570 A1 | 2/2005 | Asselborn ...................... 266/99 |
| 2005/0046595 A1 | 3/2005 | Blyth ........................... 340/908 |
| 2005/0056106 A1 | 3/2005 | Nelson et al. ................ 73/866.3 |
| 2005/0072239 A1 | 4/2005 | Longsdorf et al. ............. 73/649 |
| 2005/0074324 A1 | 4/2005 | Yoo .............................. 415/4.3 |
| 2005/0076944 A1 | 4/2005 | Kanatzidis et al. ........... 136/239 |
| 2005/0082949 A1 | 4/2005 | Tsujiura ....................... 310/339 |
| 2005/0099010 A1 | 5/2005 | Hirsch ........................... 290/42 |
| 2005/0106927 A1 | 5/2005 | Goto et al. .................... 439/404 |
| 2005/0109395 A1 | 5/2005 | Seberger .......................... 137/8 |
| 2005/0115601 A1 | 6/2005 | Olsen et al. .................. 136/212 |
| 2005/0118468 A1 | 6/2005 | Adams et al. .................. 429/22 |
| 2005/0122653 A1 | 6/2005 | McCluskey et al. ........... 361/92 |
| 2005/0130605 A1 | 6/2005 | Karschnia et al. ........... 455/90.3 |
| 2005/0132808 A1 | 6/2005 | Brown et al. ................... 73/592 |
| 2005/0134148 A1 | 6/2005 | Buhler et al. ................. 310/339 |
| 2005/0139250 A1 | 6/2005 | DeSteese et al. ............. 136/212 |
| 2005/0146220 A1 | 7/2005 | Hamel et al. ................... 307/44 |
| 2005/0153593 A1 | 7/2005 | Takayanagi et al. .......... 439/352 |
| 2005/0164684 A1 | 7/2005 | Chen et al. ................. 455/414.1 |
| 2005/0197803 A1 | 9/2005 | Eryurek et al. .............. 702/185 |
| 2005/0201349 A1 | 9/2005 | Budampati ................... 370/342 |
| 2005/0208908 A1 | 9/2005 | Karschnia et al. ......... 455/127.1 |
| 2005/0222698 A1 | 10/2005 | Eryurek et al. ................ 700/90 |
| 2005/0228509 A1 | 10/2005 | James ............................ 700/19 |
| 2005/0235758 A1 | 10/2005 | Kowal et al. ............... 73/891.29 |
| 2005/0242979 A1 | 11/2005 | Hamilton et al. ............. 341/144 |
| 2005/0245291 A1 | 11/2005 | Brown et al. ................. 455/572 |
| 2005/0276233 A1 | 12/2005 | Shepard et al. ............... 370/254 |
| 2005/0281215 A1 | 12/2005 | Budampati et al. ........... 370/328 |
| 2005/0289276 A1 * | 12/2005 | Karschnia et al. ............ 710/305 |
| 2006/0002368 A1 | 1/2006 | Budampati et al. ........... 370/351 |
| 2006/0028327 A1 | 2/2006 | Amis ............................ 340/431 |
| 2006/0036404 A1 | 2/2006 | Wiklund et al. .............. 702/183 |
| 2006/0058847 A1 | 3/2006 | Lenz et al. ....................... 607/5 |

(56) References Cited

U.S. PATENT DOCUMENTS

| | | | |
|---|---|---|---|
| 2006/0060236 A1 | 3/2006 | Kim et al. | 136/203 |
| 2006/0063522 A1 | 3/2006 | McFarland | 455/423 |
| 2006/0077917 A1 | 4/2006 | Brahmajosyula et al. | 370/310 |
| 2006/0092039 A1* | 5/2006 | Saito et al. | 340/825.37 |
| 2006/0116102 A1 | 6/2006 | Brown et al. | |
| 2006/0128689 A1 | 6/2006 | Gomtsyan et al. | 514/217.01 |
| 2006/0131428 A1 | 6/2006 | Wang et al. | 235/492 |
| 2006/0142875 A1 | 6/2006 | Keyes, IV et al. | 700/1 |
| 2006/0148410 A1 | 7/2006 | Nelson et al. | 455/67.11 |
| 2006/0181406 A1 | 8/2006 | Petite et al. | 340/521 |
| 2006/0194547 A1 | 8/2006 | Davis | 455/69 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0278023 A1 | 12/2006 | Garneyer et al. | 73/862.333 |
| 2006/0287001 A1 | 12/2006 | Budampati et al. | 455/552.1 |
| 2006/0290328 A1* | 12/2006 | Orth | 323/218 |
| 2007/0006528 A1 | 1/2007 | Diebold et al. | 48/197 R |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1 | 3/2007 | Florenz et al. | 702/50 |
| 2007/0079250 A1 | 4/2007 | Bump et al. | 715/762 |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/557 |
| 2007/0279009 A1 | 12/2007 | Kobayashi | 320/166 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samudrala et al. | 370/466 |
| 2007/0282463 A1 | 12/2007 | Hodson et al. | 700/20 |
| 2007/0285224 A1 | 12/2007 | Karschnia et al. | 340/538 |
| 2007/0288204 A1 | 12/2007 | Gienke et al. | 702/188 |
| 2008/0010600 A1 | 1/2008 | Katano | 715/748 |
| 2008/0030423 A1 | 2/2008 | Shigemoto | 343/872 |
| 2008/0054645 A1 | 3/2008 | Kulkarni et al. | |
| 2008/0079641 A1 | 4/2008 | Grunig et al. | |
| 2008/0083446 A1 | 4/2008 | Chakraborty et al. | 136/205 |
| 2008/0088464 A1 | 4/2008 | Gutierrez | 340/606 |
| 2008/0114911 A1 | 5/2008 | Schumacher | 710/72 |
| 2008/0123581 A1 | 5/2008 | Wells et al. | |
| 2008/0141769 A1 | 6/2008 | Schmidt et al. | 73/204.19 |
| 2008/0268784 A1 | 10/2008 | Kantzes et al. | 455/66.1 |
| 2008/0273486 A1 | 11/2008 | Pratt et al. | 370/328 |
| 2008/0280568 A1 | 11/2008 | Kielb et al. | 455/74.1 |
| 2008/0310195 A1 | 12/2008 | Seberger et al. | 363/26 |
| 2009/0015216 A1 | 1/2009 | Seberger et al. | 323/234 |
| 2009/0066587 A1 | 3/2009 | Hayes et al. | 343/702 |
| 2009/0081957 A1 | 3/2009 | Sinreich | 455/68 |
| 2009/0120169 A1 | 5/2009 | Chandler et al. | 73/54.41 |
| 2009/0145656 A1 | 6/2009 | Tschudin | 174/521 |
| 2009/0146502 A1 | 6/2009 | Sinreich | 307/104 |
| 2009/0167613 A1 | 7/2009 | Hershey et al. | 343/702 |
| 2009/0195222 A1 | 8/2009 | Lu et al. | 322/3 |
| 2009/0200489 A1 | 8/2009 | Tappel et al. | 250/492.3 |
| 2009/0253388 A1 | 10/2009 | Kielb et al. | 455/117 |
| 2009/0260438 A1 | 10/2009 | Hedtke | 73/579 |
| 2009/0309558 A1 | 12/2009 | Kielb | 323/234 |
| 2009/0311971 A1 | 12/2009 | Kielb et al. | 455/74.1 |
| 2009/0311975 A1 | 12/2009 | Vanderaa et al. | 455/90.3 |
| 2009/0311976 A1 | 12/2009 | Vanderaa et al. | 455/90.3 |
| 2010/0000316 A1 | 1/2010 | Fehrenbach et al. | 73/295 |
| 2010/0254900 A1 | 10/2010 | Campbell et al. | 424/1.65 |
| 2012/0041582 A1 | 2/2012 | Wallace | 700/109 |
| 2013/0207624 A1 | 8/2013 | Aaltonen et al. | 323/234 |

FOREIGN PATENT DOCUMENTS

| | | |
|---|---|---|
| CN | 1251953 | 5/2000 |
| CN | 1 429 354 A | 7/2003 |
| CN | 1 422 822 A | 9/2003 |
| CN | 1 442 822 A | 9/2003 |
| CN | 1969238 | 5/2007 |
| CN | 100386602 C | 5/2008 |
| DE | 2710211 | 9/1978 |
| DE | 3340834 A1 | 5/1985 |
| DE | 37 11 754 A1 | 10/1988 |
| DE | 38 42 379 A1 | 6/1990 |
| DE | 3842379 | 6/1990 |
| DE | 196 22 295 | 5/1996 |
| DE | 201 07 112 U1 | 7/2001 |
| DE | 04 582 A1 | 10/2001 |
| DE | 101 04 582 A1 | 10/2001 |
| DE | 100 41 160 | 3/2002 |
| DE | 102 21 931 A1 | 5/2002 |
| DE | 10 2004 020 393 | 11/2005 |
| EP | 0 518 916 B1 | 2/1991 |
| EP | 0 524 550 A1 | 1/1993 |
| EP | 0729294 | 8/1996 |
| EP | 0 895 209 A1 | 2/1999 |
| EP | 0 945 714 | 9/1999 |
| EP | 1 202 145 A | 5/2002 |
| EP | 1 202 145 A1 | 5/2002 |
| EP | 1 192 614 | 1/2003 |
| EP | 192 614 | 1/2003 |
| EP | 1 293 853 A1 | 3/2003 |
| EP | 1 879 294 | 1/2008 |
| FI | 118699 B | 2/2008 |
| GB | 1 397 435 A | 6/1975 |
| GB | 1 397 435 A | 11/1975 |
| GB | 2 300 265 A | 10/1996 |
| GB | 2 403 043 | 6/2004 |
| JP | 2-35803 | 2/1990 |
| JP | 02067794 | 7/1990 |
| JP | 4-335796 | 11/1992 |
| JP | 06 199284 A | 7/1994 |
| JP | 8-125767 | 5/1996 |
| JP | 8-249997 | 9/1996 |
| JP | 09-182308 | 7/1997 |
| JP | 2000-304148 | 11/2000 |
| JP | 2003-070079 | 11/2000 |
| JP | 2001-524226 | 11/2001 |
| JP | 2002369554 | 12/2002 |
| JP | 2003/042881 | 2/2003 |
| JP | 2003-051894 | 2/2003 |
| JP | 2003051894 | 2/2003 |
| JP | 2003134261 | 5/2003 |
| JP | 2003-195903 | 7/2003 |
| JP | 2004021877 | 1/2004 |
| JP | 2004 146254 | 5/2004 |
| JP | 2004208476 | 7/2004 |
| JP | 2004-317593 | 11/2004 |
| JP | 2005-122744 | 5/2005 |
| JP | 2005-207648 | 8/2005 |
| JP | 2006-180603 A | 7/2006 |
| JP | 2007/200940 | 8/2007 |
| JP | 2008-17663 A | 1/2008 |
| JP | 2008-504790 | 2/2008 |
| JP | 2010-530211 | 9/2010 |
| JP | 2010-530211 A | 9/2010 |
| RU | 2 131 934 C1 | 6/1999 |
| RU | 2168062 | 5/2001 |
| RU | 2342639 C2 | 8/2003 |
| RU | 2003128989 | 1/2007 |
| WO | WO 91/13417 | 9/1991 |
| WO | WO 95/07522 | 3/1995 |
| WO | WO 96/12993 | 5/1996 |
| WO | WO 99/53286 | 10/1999 |
| WO | WO 01/01742 | 1/2001 |
| WO | WO 01/48723 | 7/2001 |
| WO | WO 01/51836 | 7/2001 |
| WO | WO 01/76148 | 10/2001 |
| WO | WO 02/05241 | 1/2002 |
| WO | WO 03/023536 | 3/2003 |
| WO | WO 03/089881 | 10/2003 |

(56) References Cited

FOREIGN PATENT DOCUMENTS

| WO | WO 2004/023423 | 3/2004 |
|---|---|---|
| WO | WO 2004/038998 | 5/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2006/109362 | 10/2006 |
| WO | WO 2007/002769 | 1/2007 |
| WO | WO 2007/031435 | 3/2007 |
| WO | WO 2007/037988 | 4/2007 |
| WO | WO 2008/098583 | 8/2008 |
| WO | WO 2009/003146 | 12/2008 |
| WO | WO 2009/003148 | 12/2008 |
| WO | WO 2009/063056 | 5/2009 |

OTHER PUBLICATIONS

Third Office Action for Chinese Application No. 200680015575.4, dated May 11, 2010.
Communication for European Application No. 06774208.0, dated Apr. 16, 2010.
Second Office Action for Chinese Application No. 200680015575.4, dated Sep. 25, 2009.
Official Action for Russian Application No. 2008103014.
First Office Action for Chinese Application No. 200680015575.4, dated 2008.
Communication for European Application No. 06774208.0, dated Feb. 29, 2008.
First Office Action for Japanese Application No. 20008-518521, dated Aug. 24, 2010.
Communication from corresponding EP application Serial No. 08837236.2, dated Nov. 3, 2010.
Examination Report of the European Patent Office in Application No. 05724190.3, dated Jun. 30, 2008.
First Office Action from Chinese Patent Application No. 2005800142124, dated Mar. 14, 2008.
Office Action from related U.S. Appl. No. 10/878,235, dated Mar. 8, 2006.
Office Action from related U.S. Appl. No. 10/878,235, dated Sep. 13, 2006.
Office Action from related U.S. Appl. No. 10/878,235, dated Mar. 6, 2007.
$1^{st}$ Chinese Office Action for Chinese Application No. 200980122611.0, dated Nov. 23, 2011, 5 pages.
Official Action for the corresponding Russian patent application No. 2011101386 transmitted Dec. 23, 2011.
The International Search Report and Written Opinion in Application No. PCT/US2009/003619, dated Sep. 30, 2009.
The Official Communication in Application No. 2006/145434, filed May 5, 2005.
International Search Report and Written Opinion of Application No. PCT/US2005/015848, file May 5, 2005.
Rosemount Reference Manual 00809-0100-4022,Rev AA, Jul. 2002, "Model 4600 Oil & Gas Panel Transmitter," 65 pages.
Office Action from U.S. Appl. No. 11/028,486, dated Nov. 13, 2007.
The International Search Report and Written Opinion in Appln No. PCT/US2005/021757, filed Jun. 21, 2005.
The International Search Report and Written Opinion in Application No. PCT/US2009/003611, dated Nov. 4, 2009.
The International Search Report and Written Opinion in Application No. PCT/US2009/003621, dated Sep. 30, 2009.
The seventh Office Action from Chinese Patent App. No. 200580014212.4 issued on Jan. 31, 2011, date stamped Feb. 2, 2011.
Communication pursuant to Rules 161(1) and 162 EPC for Application No./Patent No. 09767062.4-1244 PCT/US2009003619; date Jan. 27, 2011, 3 pages.
Decision on Refusal to Grant from Russian patent application No. 2006145434 dated Feb. 18, 2011.
Rejection Notice for Japanese patent application No. 2007527282 dated Jul. 22, 2010.
Summons to attend oral proceedings for the European application No. 05746241.8 dated May 26, 2010.
The Sixth Office Action from Chinese application No. 200580014212.4, dated Aug. 17, 2010.
Conclusion and Notification on rehearing for Russian patent application No. 2006145434/09 issued on Sep. 17, 2010.
The fourth Office Action from Chinese application No. 200580014212.4, issued on Jul. 24, 2009.
Official Letter from Mexican patent application No. PA/A/2006/013488 dated Jun. 25, 2009.
Notification of Transmittal of the International Search Report and the Written Opinion for International application No. PCT/US2009/062152 dated Jun. 2, 2010.
First Office Action for Chinese application No. 200780018710.5 dated May 12, 2010.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.
First Communication from European patent application No. 06803540.1, dated Jun. 30, 2008.
Fifth Office Action from Chinese patent application No. 200580014212.4, dated Nov. 13, 2009.
Third Official Action for Russian patent application No. 2008116682, dated Sep. 11, 2009.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
Second Office Action from Russian patent application No. 2006145434 dated Apr. 2, 2008.
First Office Action from Chinese Patent Application No. 2005800142124 dated Mar. 14, 2008.
First Official Action from Russian patent application 2008116682, dated Jan. 16, 2009.
Second Office Action from Chinese patent application 200580006438.X, dated Apr. 10, 2009.
Examination Report of the European Patent Office in Application No. 05724190.3 dated Aug. 1, 2007.
The Official Communication from European patent application No. 05746241.8 dated Nov. 12, 2010.
The Minutes in accordance with Rule 124(4) EPC for European application No. 05746241.8 dated Nov. 4, 2010.
First Examination Report for Indian patent application no. 4676/CHENP/2006 dated Apr. 17, 2009.
Notification of Transmittal of the International Search Report and the Written Opinion for the international patent application No. PCT/US2010/047744 dated Dec. 10, 2010.
Fourth Official Action for Russian patent application No. 2008116682, dated Dec. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat sink . . . ,"http://www.enertron-inc.com/enertron-products/integrated-heat-sink.php, Mar. 31, 2006.
Zahnd et al., "Piezoelectric Windmill. A Novel Solution to Remote Sensing," Japanese Journal of Applied Physics, v. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.

(56) References Cited

OTHER PUBLICATIONS

Office Action from Chinese Patent Application No. 200880110323.9, dated Jan. 29, 2012.
Written Opinion from Singapore Patent Application No. 201009093-4, dated Feb. 20, 2012.
Written Opinion and Search Report from the related Singapore patent application No. 201009226-0 dated Mar. 16, 2012.
Office Action from the related Russian patent application No. 2011101364 dated Feb. 8, 2012.
Communication Pursuant to Rules 161(1) and 162 EPC for application Serial No. EP 09767062.4, dated Jan. 27, 2011.
Communication pursuant to Rules 161 and 162 EPC from European patent application No. 09767057.4 dated Jan. 26, 2011.
Communication pursuant to Rules 161 and 162 EPC from European patent application No. 09767063.2 dated Jan. 28, 2011.
The International Search Report from PCT Application No. PCT/US2011/047026, dated Jul. 11, 2011, 4 pgs.
The Written Opinion from International Search Report from PCT Application No. PCT/US2011/047026, dated Jul. 11, 2011, 8 pgs.
Office Action from corresponding European Application No. EP 09767062.4, dated Jul. 13, 2011, 5 pgs.
Second Examination Report for Indian patent application No. 4676/CHENP/2006 dated Apr. 8, 2010.
Notification of Transmittal of the International Search Report and the Written Opinion, in related application PCT/US2009/003636, dated Oct. 6, 2009.
2nd Chinese Office Action for Chinese Application No. 200680035248.5, dated Oct. 19, 2011, 22 pgs.
Notification of Transmittal of International Search Report and the Written Opinion for international patent application No. PCT/US2010/047463, dated Dec. 1, 2010.
Notification of Transmittal of International Search Report and the Written Opinion for international patent application No. PCT/US2010/047444, dated Dec. 10, 2010.
Chinese Office Action from CN200980122835.1, dated Jul. 3, 2012, 20 pages.
Japanese Office Action from JP 2011-514605, dated Jun. 19, 2012, 7 pages.
First Chinese Office Action from CN 200980122761.1, dated Aug. 31, 2012, 9 pages.
Rejection Notice from JP 2011-514611, dated Aug. 20, 2012, 5 pages.
First Office Action from Japanese patent application No. 2011514603, dated Jul. 10, 2012.
First Office Action from Chinese patent application No. 200980122613.X, dated Aug. 15, 2012.
Second Office Action from Chinese patent application No. 200980122611.0 dated Aug. 20, 2012.
Official Action from Canadian patent application No. 2563337 dated Sep. 4, 2012.
Official Action from Russian patent application No. 2009139488, dated Oct. 8, 2012. 3 pages.
Examination Report for the related Singapore application No. 201009226-0 dated Oct. 12, 2012.
Invitation to Response to Written Opinion for Singapore application No. 201009093-4 dated Nov. 5, 2012.
Official Action for Canadian Patent Application No. 2,726,601, dated Apr. 12, 2013, 3 pages.
Official Action from Canadian Patent Application No. 2726613, dated Jan. 11, 2013, 3 pages.
Official Action from Canadian Patent Application No. 2726608, dated Dec. 5, 2012, 2 pages.
Examination Report from Singapore Patent Application No. 2010092278, dated Jan. 7, 2013, 7 pages.
Second Chinese Office Action for Chinese Patent Application No. 200980122761.1, dated May 21, 2013, 17 pages.
Office Action from U.S. Appl. No. 12/486,253, dated Mar. 16, 2011.
Office Action from U.S. Appl. No. 12/486,269, dated Oct. 22, 2013.
Office Action from U.S. Appl. No. 12/486,269, dated Apr. 11, 2013.
Office Action from U.S. Appl. No. 12/486,269, dated Mar. 1, 2012.

Office Action from U.S. Appl. No. 12/486,269, dated Oct. 11, 2011.
The third Office Action from Chinese patent Application No. 200580014212.4, dated Dec. 19, 2008.
The International Search Report and Written Opinion in Application No. PCT/US2009/003616, dated Jan. 13, 2010.
Communication Pursuant to Rules 161(1) and 162 EPC for application Serial No. EP 10752246.8, dated May 3, 2012.
Written Opinion for the related Singapore patent application No. 2010092278 dated Feb. 16, 2012.
Written Opinion for the related Singapore patent application No. 2010092245 dated Jan. 6, 2012.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Decision of Rejection (final rejection) for Japanese Patent Application No. 2011-514604, dated Jan. 29, 2013, 8 pages.
Second Office Action for Chinese Patent Application No. 200980122835.1, dated Mar. 15, 2013, 20 pages.
Second Office Action from Chinese patent application No. 200980122613.X, dated May 9, 2013.
First Office Action from the related Japanese patent application No. 2012-527988, dated May 14, 2013.
Office Action from Chinese patent application No. 200980122835.1 dated Sep. 24, 2013.
Office Action from the realated Japanese patent application No. 2012527994 dated Jun. 11, 2013.
Rejection Decision dated Dec. 12, 2013 in related Chinese Patent Application No. 200980122761.1, 20 pgs. including English Translation.
Coy of Canadian Office Action for Canadian Patent Application No. 2,726,601, dated Mar. 25, 2014, 3 pages.
Rejection Notice from JP 2011-514611, dated Aug. 20, 2012, 5 pgs.
Chinese Office Action from CN200980122761.1, dated Dec. 12, 2013.
First Office Action (Notification of Reasons for Rejection) dated Jan. 28, 2014 in related Japanese Patent Application No. 2013-524161. 5 pgs including English Translation.
3rd Office Action dated Jan. 17, 2014 in Chinese Patent Application No. 200980122613.X, 9 pgs including English translation.
Office Action from Chinese Application No. 200980122835.1, dated Apr. 9, 2014.
Office Action from U.S. Appl. No. 11/028,486 dated May 9, 2008.
Notification of Transmittal of the International Search Report and Written Opinion, PCT/US2009/0036616, dated Jan. 13, 2010.
U.S. Appl. No. 12/485,169, filed Jun. 16, 2009.
U.S. Appl. No. 12/485,189, filed Jun. 16, 2009.
U.S. Appl. No. 12/486,282, filed Jun. 17, 2009.
U.S. Appl. No. 12/486,269, filed Jun. 17, 2009.
U.S. Appl. No. 12/486,253, filed Jun. 17, 2009.
International Search Report and Written Opinion in Application No. PCT/US2009/003619, dated Sep. 30, 2009.
Office Action from Chinese patent Application No. 2005800142124, dated Mar. 14, 2008.
Office Action from Chinese patent Application No. 200580006438.X, filed Mar. 2, 2005.
Examiner's Consultation from European patent Application No. 05724190.3, dated Jun. 30, 2008.
Office Action from Russian Patent Office in Russian Serial No. 2006145434.
Official Communication in Application No. 2006/145434, filed May 5, 2005.
Office Action from European Application No. 05746241.8, dated Aug. 29, 2007.
"Wireless R&D Aims to Boos Traffic," by M. Moore, InTech with Industrial Computing, Feb. 2002, pp. 40-41.
"System Checks Farawy Machines' Health," by J. Strothman, InTech with Industrial Computing, Feb. 2002, pp. 42-43.
Notification of Transmittal of the International Search Report or the Declaration—PCT/US03/10403.
"Wireless Management Toolkit Xyr 5000", by Honeywell International Inc., Phoenix, Arizona, 3 pgs., Oct. 2003.

(56) References Cited

OTHER PUBLICATIONS

"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. Ii, iii, iv and 1-12, Dec. 2003.
International Search Report and Written Opinion of Application No. PCT/US2005-015848, file May 5, 2005.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
Notification of Transmittal of the International Search Report and the Written Opinion—PCT/US2005/021757.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022, Rev AA, Jul. 2002, "Model 4600 Oil & Gas Panel Transmitter," 65 pages.
Transmitter Schematic, Sold Jul. 2002, 5 pages.
Notification of Transmittal of the International Search Report and the Written Opinion of the International Searching Authority for International Application No. PCT/US2005/007328 filed Mar. 7, 2005. Date of Mailing: Jan. 12, 2006.
4 Pages from Website http://content.honeywell.com/imc/eznews/eznews0403/news.htm, 2004.
Notification of Transmittal of the International Search Report and the Written Opinion of the International Searching Authority for International Application No. PCT/US2006/025206 filed Jun. 27, 2006.
"Mechatronic Drives in Mobile Hydraulics," Internet Article, Soncebox News. No. 4, Oct. 2004.
USA & Metric Thread Standards http://www.carrlane.com/Catalog/index.cfm/29425071F0B221118070C1C513906103E0B05543B0B012009083C3B285357474A2D020609090C0015312A36515F554A5B.
U.S. Appl. No. 61/012,262, filed Dec. 7, 2007.
U.S. Appl. No. 60/937,396, filed Jun. 26, 2007.
U.S. Appl. No. 60/937,397, filed Jun. 26, 2007.
Office Action from European Application No. 05853808.3, dated Nov. 5, 2007.
Office Action from U.S. Patent Office in U.S. U.S. Appl. No. 11/028,486, dated Nov. 13, 2007.
Office Action from U.S. Patent Office in U.S. U.S. Appl. No. 11/028,486 dated May 9, 2008.
"Written Opinion of the International Searching Authority" for PCT/US2008/011451 filed Oct. 3, 2008; date stamped Mar. 31, 2009; 10 pages.
"Notification of Transmittal of the International Search Report and The Written Opinion of the International Searching Authority" for PCT/US2008/011451 filed Oct. 3, 2008; date mailed Mar. 30, 2009; 3 pages.
"International Search Report" for PCT/US2008/011451 filed Oct. 3, 2008; date stamped Mar. 31, 2009; 4 pages.
International Search Report and Written Opinion in Appln No. PCT/US2005/021757, filed Jun. 21, 2005.
International Search Report and Written Opinion in Application No. PCT/US2006/035728, filed Sep. 13, 2006.
International Search Report and Written Opinion in Application No. PCT/US2009/003611, dated Nov. 4, 2009.
International Search Report and Written Opinion in Application No. PCT/US2009/003621, dated Sep. 30, 2009.

\* cited by examiner

RF ADAPTER FOR FIELD DEVICE WITH VARIABLE VOLTAGE DROP

CROSS-REFERENCE TO RELATED APPLICATION

The present application is based on and claims the benefit of U.S. Application No. 61/073,096, filed Jun. 17, 2008, the content of which is hereby incorporated by reference in its entirety. The present application also notes the following related patent applications: U.S. application Ser. No. 12/125,187, filed May 22, 2008; U.S. Ser. No. 60/997,760, filed Oct. 5, 2007; U.S. Ser. No. 11/842,356, filed Aug. 21, 2007; and U.S. Ser. No. 10/878,235, filed Jun. 28, 2004, now U.S. Pat. No. 7,262,693, the contents of which are hereby incorporated by reference in their entirety.

BACKGROUND OF THE INVENTION

The present invention relates to industrial process control or monitoring systems. More specifically, the present invention relates to field devices in such systems which are capable of Radio Frequency (RF) communication.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two-wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices.

In some installations, wireless technologies have begun to be used to communicate with field devices. For example, completely wireless installations are used in which the field device uses a battery, solar cell, or other technique to obtain power without any sort of wired connection. However, the majority of field devices are hardwired to a process control room and do not use wireless communication techniques. Further, in many field installations, "intrinsic safety" standards must be implemented which limit the amount of stored energy which can be discharged into the environment.

In some configurations, an RF adapter can be connected in series with the process control loop. In such a configuration, the voltage drop across terminals of the adapter may affect operation of the process control loop. Further, the amount of this voltage drop affects the maximum power available to the adapter for use in operation of circuitry of the adapter.

SUMMARY OF THE INVENTION

A wireless adapter for use in a two-wire process control loop includes wireless communication circuitry and first and second terminals configured to couple in series with the two-wire process control loop. A regulator having a regulator input is coupled to the first terminal and an output. Shunt circuitry is coupled to the output of the regulator and is configured to provide power to the wireless communication circuitry. A feedback circuit is configured to control current flowing from the regulator to the shunt circuitry as a function of a loop current flowing through the two-wire process control loop.

DETAILED DESCRIPTION OF ILLUSTRATIVE EMBODIMENTS

The present invention provides a wireless adapter for use with a field device in an industrial process control or monitoring system. The wireless adapter couples to the field device and provides the field device with wireless communication abilities. The adapter also couples to a two-wire process control loop which is used to connect the field device to a local location such as a process control room or the like. The adapter has a power supply arrangement which allows the voltage drop across terminals of the adapter to vary.

Figure 1:
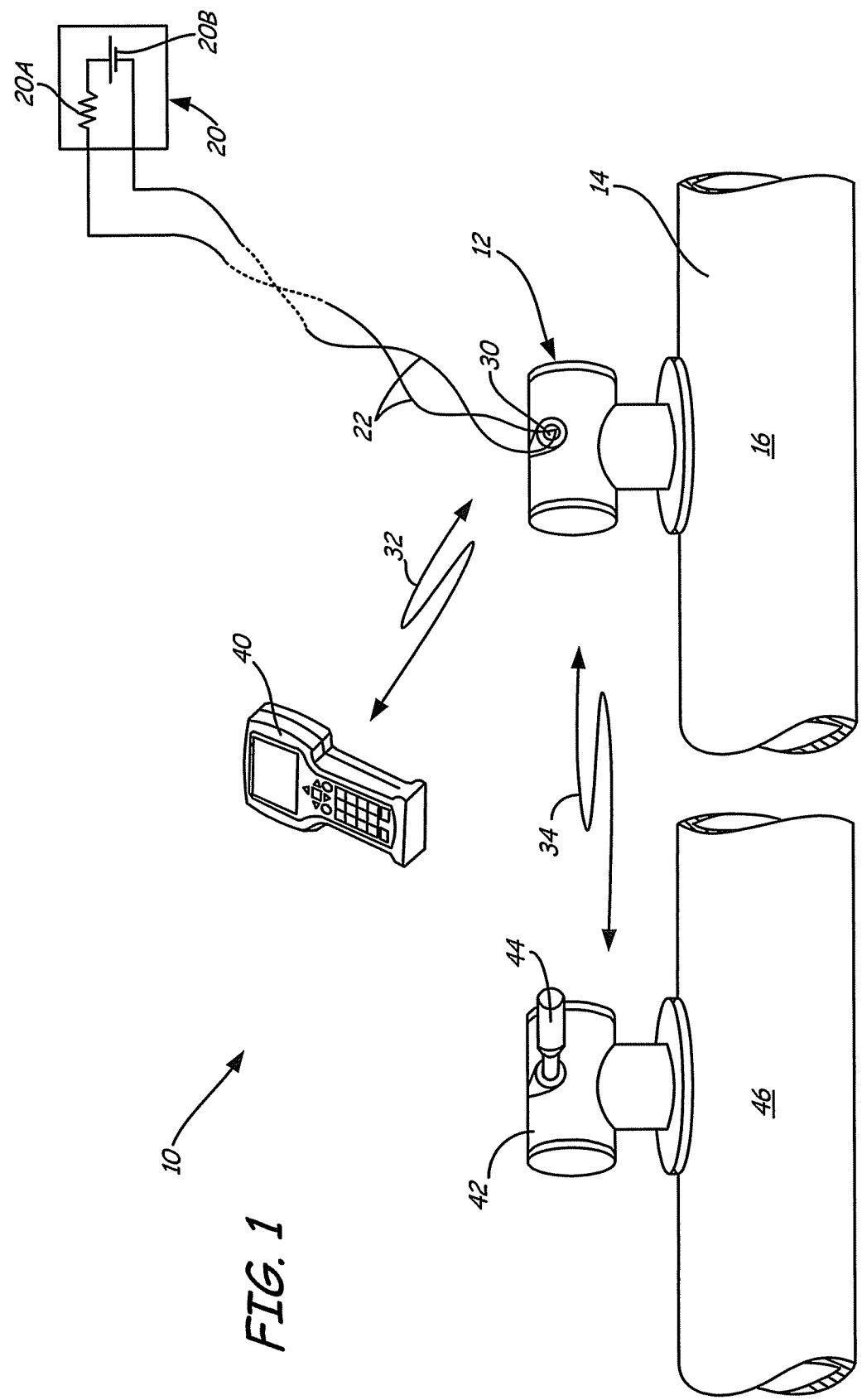
FIG. 1 is a simplified diagram showing an industrial process control or monitoring system which includes field devices having wireless adapters.

FIG. 1 is a simplified block diagram of a process control and monitoring system 10. In FIG. 1, field device 12 is shown coupled to process piping 14 which carries a process fluid 16. In this example, the field device 12 is illustrated as being a process variable transmitter. For example, a process variable transmitter may measure a process variable of process piping 14 such as pressure, flow rate, temperature, etc. Other types of field devices include control devices which are used to control operation of industrial process 10. However, the present invention is not limited to such a device. Field device 12 is typically located at a remote location, for example in a field of an industrial process plant and couples to a local location, such as a control room 20 through a two-wire process control loop 22. Control room 20 includes a load resistance 20A and a power source 20B. The two-wire process control loop 22 can operate in accordance with any appropriate standard or technique. A typical communications standard includes 4-20 mA process control loops in which a process variable is represented by a current level flowing through the process control loop. Another example includes digital communication techniques which may be modulated onto the analog current level of the two-wire loop, for example HART® communication standard. Other purely digital techniques are also employed including FieldBus based protocols. Typically, the field device 12 is powered using power received over the process control loop 22.

In FIG. 1, a wireless adapter 30 is shown coupled to the field device 12. Wireless adapter 30 can be used for wireless communications, illustrated by arrows 32 and 34 with other devices. For example, the adapter 30 can communicate with a handheld communicator 40 or another field device 42 which includes a wireless adapter 44. Field device 42 is shown coupled to process piping 46.

Figure 2:
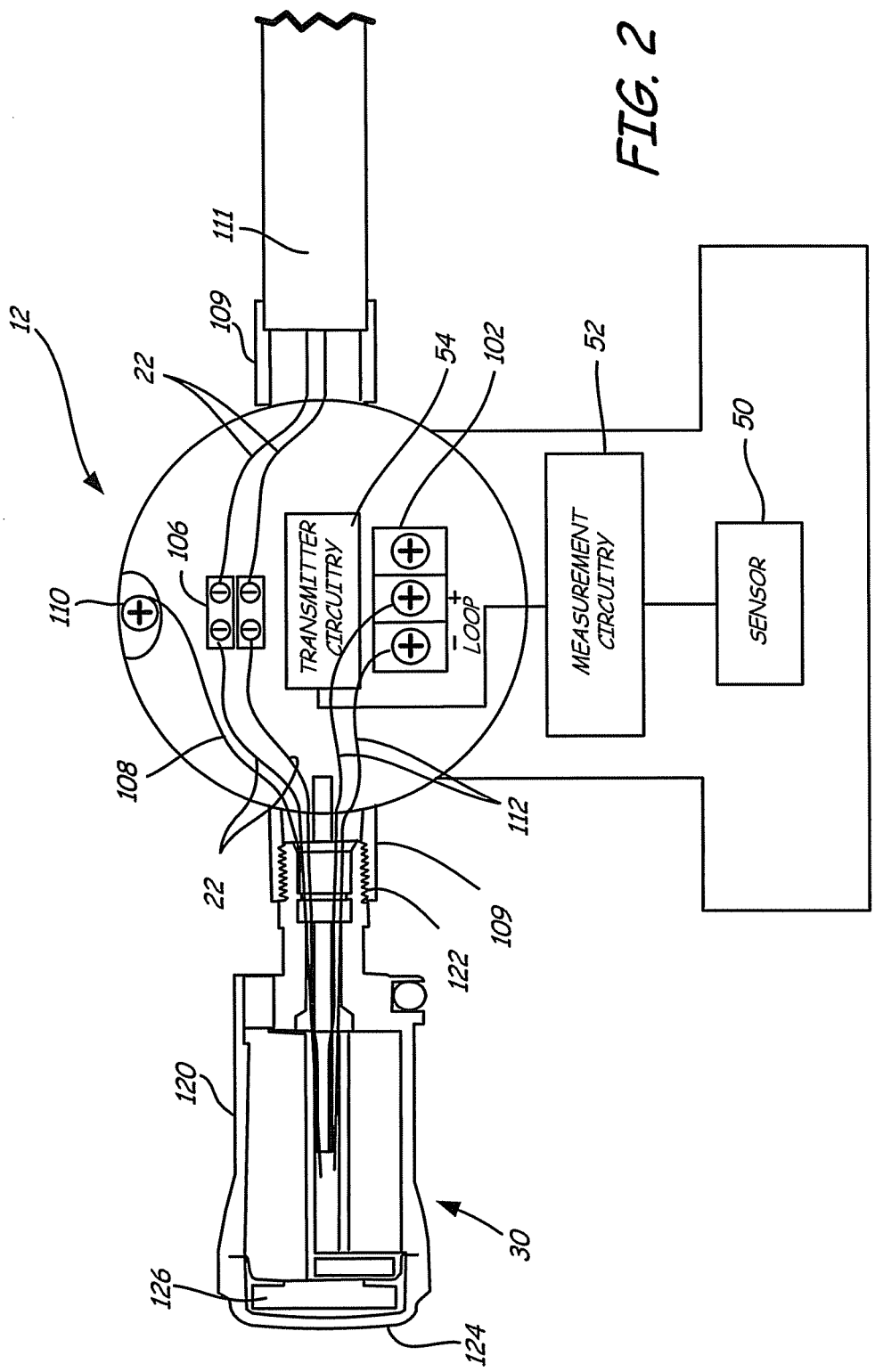
FIG. 2 is a cross-sectional view of a field device of FIG. 1 including a wireless adapter.

The wireless adapter 30 can communicate to other devices or components as desired. The communication can be in accordance with any appropriate protocols. One example protocol includes the formation of a mesh network in which data is passed between wireless devices in order to expand and improve the reliability of the communication system FIG. 2 shows a simplified cross-sectional view of field device 12 and wireless adapter 30 coupled to two-wire process control loop 22. In the example of a process variable transmitter, field device 12 includes a process variable sensor 50 which is connected to measurement circuitry 52 configured to measure a process variable. Transmitter circuitry 54 is configured to receive the process variable and communicate the process variable onto the two-wire process control loop 22 using known techniques. The transmitter 12 couples to the two-wire process control loop through connection block 106. The wireless adapter 30 also couples to connection block 106 and is mounted to the housing of transmitter 12, for example, through threaded connections 122 and 109. For example, the coupling is through an NPT conduit coupling 109. A similar conduit connection 109 is also used to couple to conduit 111 which carries the two-wire process control loop 22 therethrough. The chassis of the wireless adapter 30 couples to an electrical ground connector 110 of transmitter 12 through wire 108. The transmitter 12 includes a two-wire process control connection block 102 which couples to connection 112 from the wireless adapter 30. A housing 120 of the wireless adapter 30 carries an antenna 126 which couples to circuitry of the wireless adapter 30. An RF transparent end cap 124 can be sealably coupled to the housing 120 to allow transmission of RF signals therethrough. In the arrangements shown in FIG. 2, five electrical connections are provided to the RF adapter which include four loop connections along with an electrical ground connection.

Figure 3:
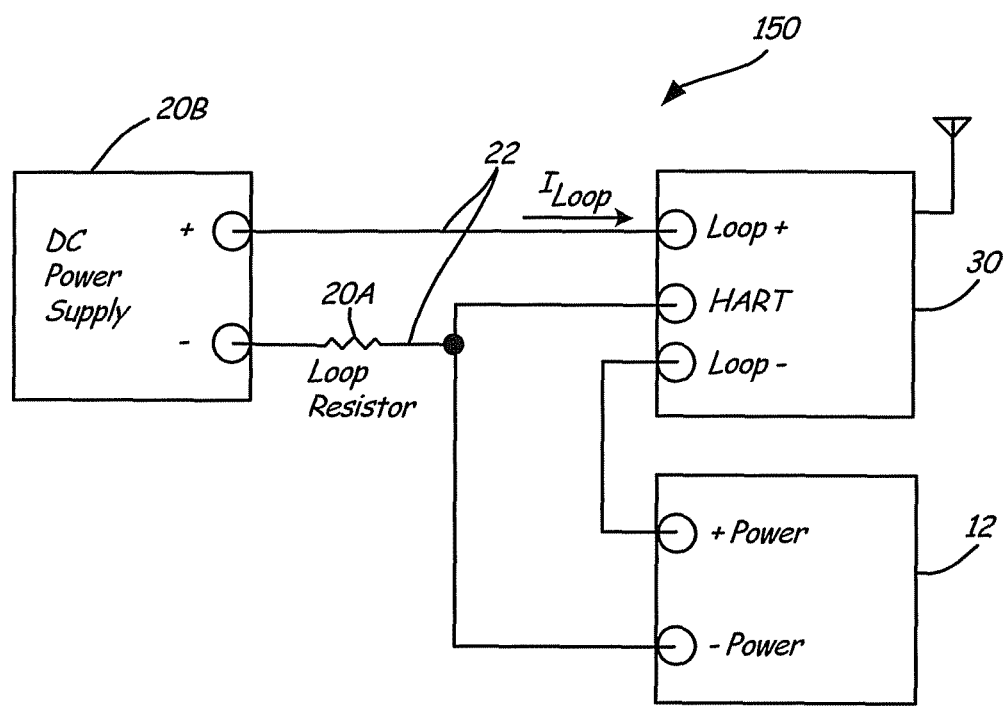
FIG. 3 is a wiring diagram showing a field device and wireless adapter coupled to a two-wire process control loop.

FIG. 3 shows a simplified block diagram 150 which illustrates the electrical connections between the control room 20, the field device 12 and the wireless adapter 30. As illustrated in FIG. 3, the wireless adapter 30 is coupled in series with the process control loop 22 through the Loop+ (also identified herein as L+) and Loop− (also identified herein as L−) connections and the field device 12 is also coupled in series with its plus power and minus power connections. HART® communication connection is used by the adapter 30 to communicate on the process control loop 22.

During operation, the adapter 30 operates using current from the 4-20 mA current flowing through the process control loop 22. As current flows through adapter 30, a small voltage drop occurs across its L+ and L− terminal connections. Preferably, the amount of that voltage drop is kept sufficiently small to ensure that there is enough voltage remaining in the process control loop 22 to provide power to the field device 12. For example, the voltage that the adapter drops may be on the order of 1.0 volts. The current in the process control loop may be as low as 3.5 mA under some conditions, and as high as 25 mA under other conditions. Therefore, in such a configuration, the power available to the adapter 30 may vary from 3.5 mA to 25 mA assuming a fixed 1.0 volt drop. Thus, the circuitry of the adapter 30 receives more operating power when the loop is operating at higher current levels.

In FIG. 3, the load resistor 20A is illustrated. Load resistor 20A is used by the process control system to sense the current $I_{Loop}$ flowing through the process control loop 22. For example, a process control system can convert a measured voltage across the load resistance to a value which is indicative of the process variable being sensed by a process variable transmitter. This variable may be related, for example, to process pressure, temperature, level, flow, or some other measured parameter. Typically, the load resistance has a value of 250 ohms. When the process control loop is carrying 4 mA, the voltage across this resistor is 1.0 volts. Similarly, when the process control loop is operating at 20 mA, the voltage drop across the resistor is 5 volts. If the voltage drop of the process variable transmitter is relatively constant as the current in the loop varies, there is more voltage available for the circuitry of adapter 30 when the control loop is operating at 4 mA than when the control loop is operating at 20 mA. The present invention provides a technique for varying the voltage drop across the adapter whereby a greater voltage drop is available to the adapter (and more power is available to the adapter) when the current flowing through the process control loop is at a low value. Similarly, less voltage drop is provided across the adapter when the loop is operating at a higher current level. In this way, the minimum power that the adapter 30 may obtain is raised and therefore the performance in the circuitry can be improved, for example, to increase wireless communication power.

Figure 4:
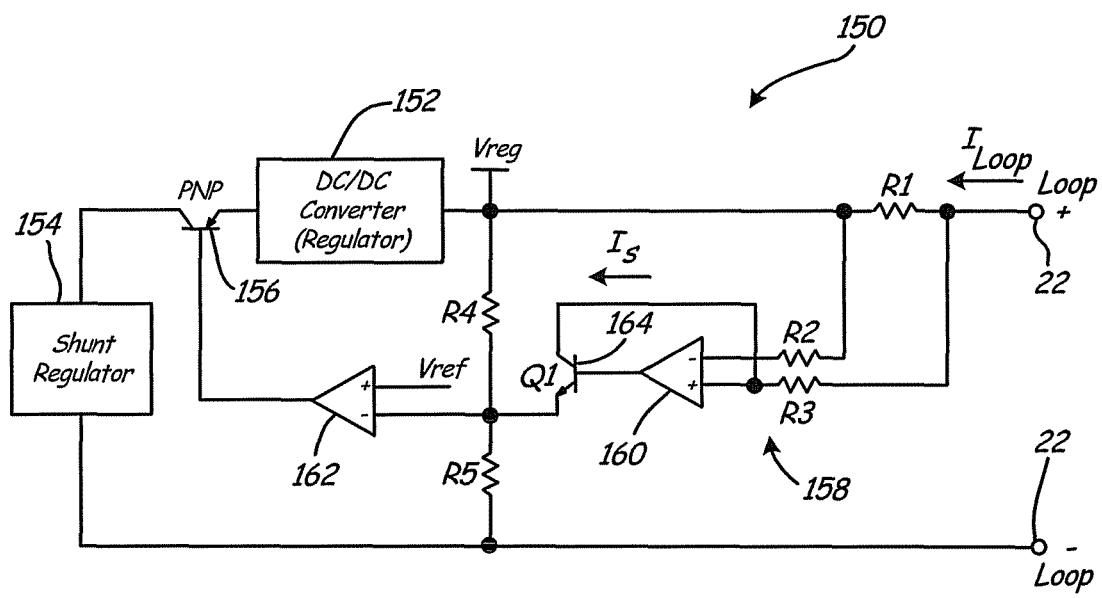
FIG. 4 shows an example configuration of a variable voltage drop circuit for coupling to a two-wire process control loop.

FIG. 4 is a simplified schematic diagram of variable voltage drop circuitry 150 in accordance with one example embodiment. Variable voltage drop 150 includes a DC to DC switching converter or switching regulator 152 which is coupled to a shunt regulator 154 through a transistor 156. The input of regulator 152 couples to the process control loop 22 through a resistor $R_1$. The input to regulator 152 is at a voltage level $V_{reg}$. The base of transistor 156 is coupled to feedback circuitry 158 which comprises OpAmps 160 and 162, transistor 164 and resistors $R_2$, $R_3$, $R_4$ and $R_5$.

The circuitry shown in FIG. 4 senses the loop current using resistor $R_1$ and varies the regulated voltage at the terminals L+ and L−. OpAmp 160 operates as a current sensing amplifier and creates a voltage drop across $R_3$ that is equal to the voltage drop across $R_1$ by varying the current $I_S$. The relationship between $I_S$ and the loop current is as follows:

$$I_{Loop} * R_1 = I_s * R_3 \qquad \text{Eq. 1}$$

$$I_s = I_{Loop} * (R_1/R_3) \qquad \text{Eq. 2}$$

Thus, the current $I_s$ is proportional to the loop current based upon the ratio established by $R_1$ and $R_3$. Example values for $R_1$ and $R_3$ may be 1 ohm and 5000 ohms, respectively. In such a configuration, $I_s$ is equal to the loop current divided by 5000.

OpAmp 162 operates to regulate the voltage drop across L+ and L− terminals of the adapter by varying the current to the shunt regulator 154 by maintaining the voltage on its inverting input equal to the voltage on its non-inverting input. In FIG. 4, the non-inverting input is coupled to a reference voltage $V_{ref}$. $V_{reg}$ is the value of the voltage across the loop terminals. The reference voltage $V_{ref}$ can be established using any appropriate technique, for example, using a band gap voltage reference. The inverting input of OpAmp 162 operates as a summing node into which current $I_s$ flows. As the voltage across $R_5$ is fixed, the current through $R_5$ is also fixed. Therefore, as $I_s$ varies with the loop current, the current flowing through $R_4$ varies in an equal but opposite manner. As $I_s$ increases with the loop current, the current through $R_4$ decreases and therefore $V_{reg}$, the voltage across the L+ and the L− decreases. This causes a lower voltage drop across the terminals as the current in the process control loop 22 increases. For example, the value of $V_{reg}$ when the loop is operating at 4 mA and 20 mA can be adjusted by changing the values of $R_1$, $R_3$, $R_4$ and $R_5$. If $R_1$ is one ohm, $R_3$ is 5000 ohms, $R_4$ is 309 kohms, $R_5$ is 39.1 kohms, and $V_{ref}$=0.25 volts, then $V_{reg}$ will be 1.98 volts when the loop 22 is operating at 4 mA and 0.99 volts when the loop is operating at 20 mA.

One feature of the configuration shown in FIG. 4 is that the circuitry has a very fast response time. For example, the loop current may change from 4 to 20 mA in a relatively short period of time. It is important that if a change occurs, the voltage drop will change as quickly as possible. This is because at 20 mA loop currents, the load resistor 20A "consumes" more of the loop voltage. To ensure that the process device, such as a process variable transmitter, always has sufficient voltage for operation, the voltage drop across the adapter 30 must change rapidly in response to changes in the loop current.

Figure 5:
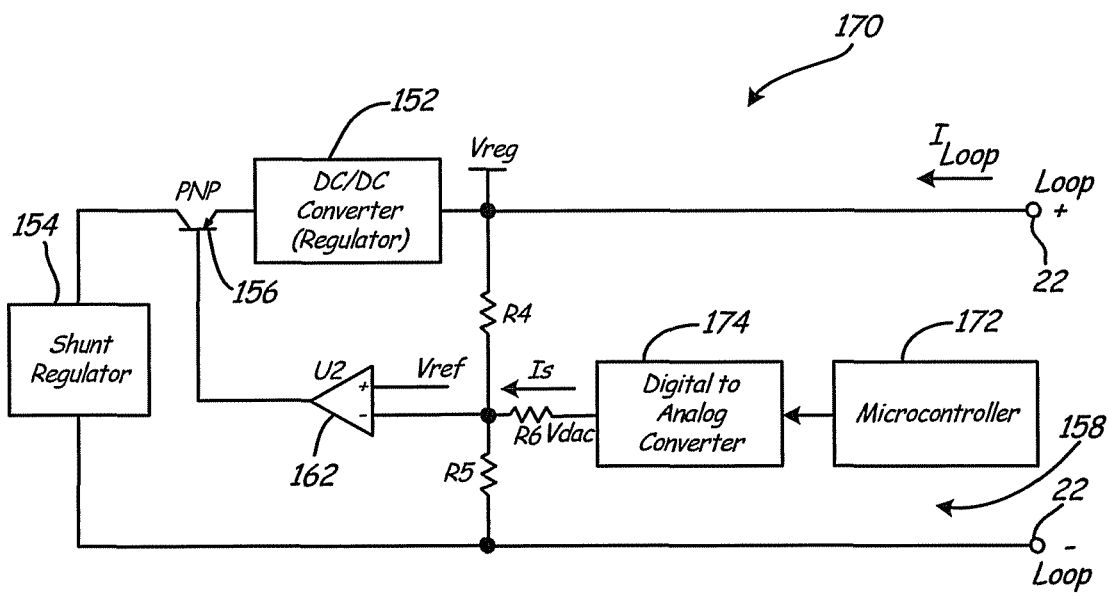
FIG. 5 shows another example embodiment of a variable voltage drop circuit including a microcontroller.

FIG. 5 shows another example embodiment of variable voltage drop circuitry 170 in which the voltage drop is controlled by a microprocessor 172. Microprocessor 172 provides a digital value to digital to analog converter 174 which connects to the inverting terminal of OpAmp 162 through a resistor $R_6$. In this configuration, the feedback circuitry 158 can operate in an open loop configuration such that the current $I_S$ into the summing node of OpAmp 162 can be varied as desired. Thus, the voltage drop across the L+ and L− terminals can be varied as desired. For example, $V_{reg}$ can be set during manufacture and modified during operation depending upon the voltage available to the adapter circuitry in a particular process control loop 22. However, one drawback to such a configuration is that the voltage available for the adapter 30 must be predetermined by either the manufacturer or operator. Further, this configuration does not take advantage of the fact that more voltage will be available to the adapter 30 when the loop current is low than when the loop current is high.

Figure 6:
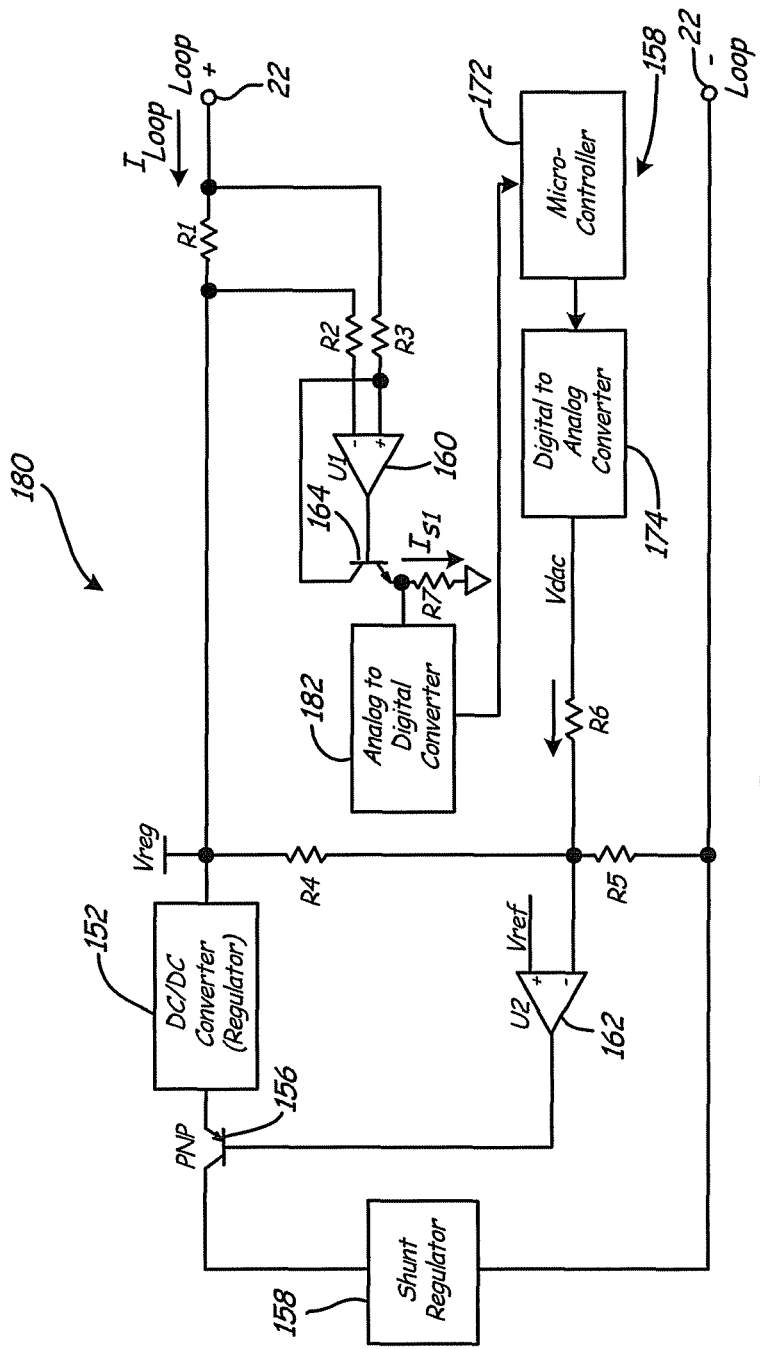
FIG. 6 is another example configuration of a variable voltage drop circuit including a microcontroller having feedback.

FIG. 6 shows another example configuration in which the micro controller 172 receives a digital representation of the current $I_{Loop}$ flowing through the process control loop 22. Note that similar elements have retained their numbering. In FIG. 6, an analog to digital converter 182 is arranged to sense a voltage drop across a resistor $R_7$ which is proportional to the current $I_{S1}$. This value is digitized and provided to microcontroller 172. As discussed above, microcontroller 172 can then control the voltage across the L+ and L− terminals by controlling the digital to analog converter 174. One advantage of such configuration is that the microcontroller 172 is able to receive information related to the loop current and this information can be communicated, for example using HART® communication, to an operator over the process control loop 22 or through the wireless interface. However, the additional analog to digital and digital to analog converters, as well as the decreased speed of the system, provide disadvantages.

In the above circuitry configurations there are situations which may cause the circuitry to reset. For example, if the circuitry is set such that $V_{reg}$ is approximately 2.25 volts when the loop current is operating at 3.5 mA, and decreases to approximately 1.0 volts when the loop current increases to 25 mA. A failure in the loop may cause the loop current to increase beyond 25 mA. If this happens, the voltage $V_{reg}$ will continue to increase and approach the value of $V_{ref}$ which is coupled to OpAmp 162. If the DC to DC switching regulator 152 requires a voltage input which is greater than $V_{ref}$ for operation, the output from the DC to DC converter will decrease and potentially cause the microprocessor or wireless communication circuitry in the adapter 30 to reset. If the wireless communication circuitry resets, the adapter 30 will disconnect from the wireless communication network and require a rejoining process once the circuitry is stable. During such an occurrence, it is not possible to communicate wirelessly with the device. If a mesh network is employed, the network may need to reconfigure itself. Further, the OpAmp 160 must be able to function with its input terminals operating near the upper power supply voltage. For example, the supply voltage may be approximately 2.35 volts. It may be desired that the voltage across the L+ and L− terminals may be as high as 2.5 volts. In such a situation, the input terminals of OpAmp 160 may exceed the positive power supply voltage.

Figure 7:
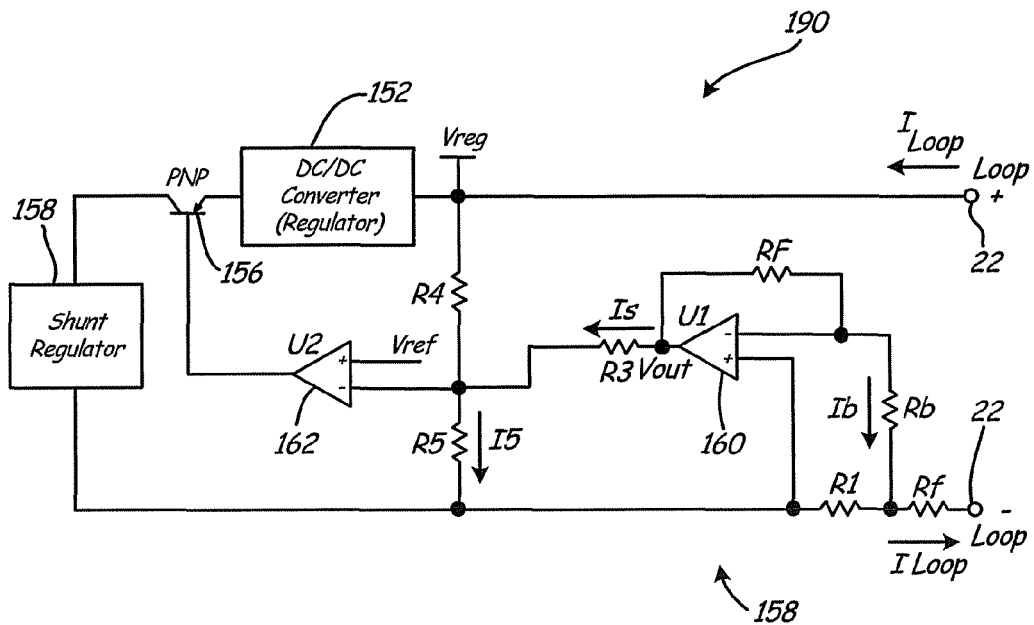
FIG. 7 is a simplified circuit diagram of a variable voltage drop circuit having another example configuration.

FIG. 7 is a schematic diagram of variable voltage drop circuitry 190 which is configured such that the circuitry does not cause the loop terminal voltage to drop below the operating range of the switching regulator 152 and does not require that the current sensing OpAmp be operated near its positive power supply voltage. In FIG. 7, similar elements have retained their numbering. However, note that in FIG. 7, $R_3$ has a new location at the output of OpAmp 160. Further, $R_1$ is connected in series with the negative loop terminal. In this configuration, OpAmp 160 creates an output voltage that is proportional to the current flowing through $R_1$. The varying voltage of this output causes a varying current through resistor $R_3$, which in turn causes an equally varying current through resistor $R_4$. This varying current through $R_4$ causes $V_{reg}$ to also change. The relationship between loop current and $V_{reg}$ is as follows:

$$I_{Loop}*R_1 = I_b*R_b \qquad \text{Eq. 3}$$

$$I_{Loop} = I_b*R_b/R_1 \qquad \text{Eq. 4}$$

$$V_{out} = I_b*RF + I_b*R_b + I_{Loop}*R_f \qquad \text{Eq. 5}$$

Now, substituting Equation 4 into Equation 5:

$$V_{out} = I_{Loop}*(R_1/R_b)*(R_f+R_b) + I_{Loop}*R_f \qquad \text{Eq. 6}$$

$$I_S = (V_{out} - V_{ref})/R_3 \qquad \text{Eq. 7}$$

$$V_{reg} = (I_S + I_5)*R_4 + V_{ref} \qquad \text{Eq. 8}$$

Equation 6 above shows that the output of OpAmp 160 ($V_{out}$) is directly proportional to the current flowing through the adapter, $I_{Loop}$. As $I_{Loop}$ increases, $I_S$ increases due to $V_{out}$ increasing as shown in the relationships set forth in Equation 7. As $I_S$ increases, the current flowing through $R_4$ must decrease as the current flowing through $R_5$ is constant because $V_{ref}$ is constant. As the current flowing $R_4$ decreases, the voltage across $R_4$ decreases and therefore $V_{reg}$ decreases. Thus, the equations illustrate that as the loop current increases the voltage across the adapter loop terminals ($V_{reg}$) decreases.

The circuitry of FIG. 7 overcomes the first drawback discussed above as the input terminals of OpAmp 160 operate slightly below the negative power supply of voltage of the device. One example OpAmp is the LMP2231 available from National Semiconductor which is capable of operating with its input terminal voltages below the negative power supply voltage. The device can also operate using a relatively low power supply voltage and supply current. The device has a low input offset voltage as well as low input offset voltage drift due to ambient temperature changes.

If the resistor values of the circuitry shown in FIG. 7 are selected correctly, the second shortcoming discussed above can be overcome. As the output $V_{out}$ of OpAmp 160 saturates at or near the positive power supply voltage, the resistors values may be selected such that when the loop current reaches 25 mA, the output $V_{out}$ can no longer increase. If the output of OpAmp 160 does not increase further, the value of $V_{reg}$ will similarly decrease no further. Therefore, these circuits can be arranged such that $V_{reg}$ reaches a minimum value when $I_{Loop}$ reaches 25 mA which will not be exceeded. If $I_{Loop}$ increases beyond 25 mA, $V_{reg}$ will maintain this minimum voltage and thus the DC to DC converter 152 will always have sufficient voltage for operation. This will ensure that the microprocessor and wireless communication circuitry of the adapter 30 will continue operating even if the loop current has an abnormally high value.

Figure 8:
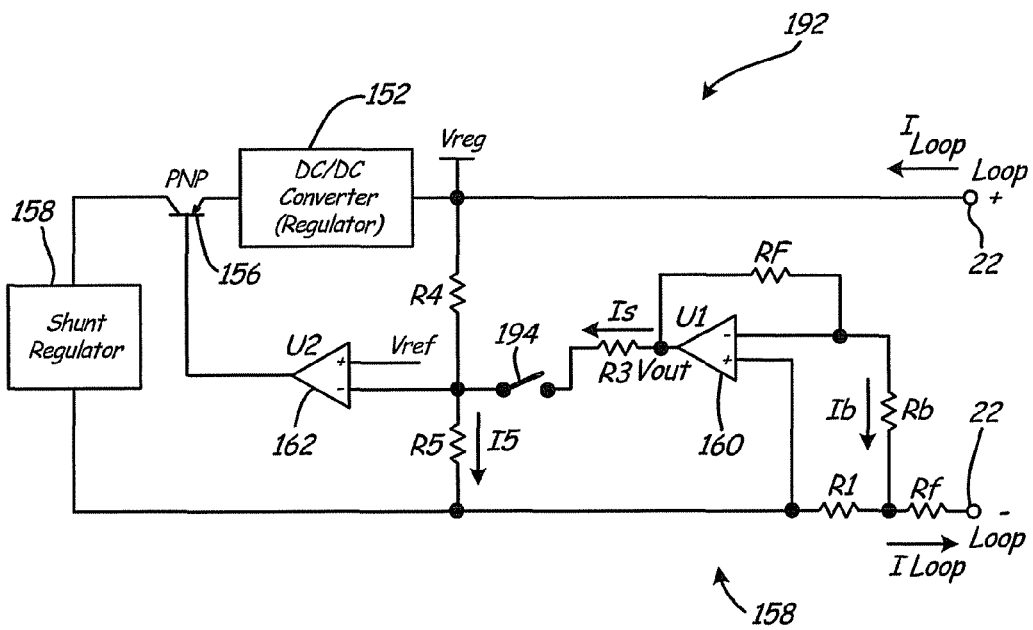
FIG. 8 is a schematic diagram of a variable voltage drop circuit including a switch for switching between a variable and a fixed voltage drop mode.

Further, similar to some of the circuits discussed above, the circuit 190 shown in FIG. 7 has a relatively fast response time. One additional advantage of the configuration shown in FIG. 7 is that the circuitry may be easily modified to provide a fixed voltage drop. FIG. 8 shows an example variable or fixed voltage drop circuit 192. Circuit 192 is similar to circuit 190 shown in FIG. 7 except that a switch 194 is included in the path of current $I_S$. When switch 194 is opened, $I_S$ becomes zero and the voltage across $R_4$ no longer changes such that $V_{reg}$ no longer changes. Thus, the circuit of FIG. 8 is switchable between a variable voltage drop circuit and a fixed voltage drop circuit. One example switch which may be employed is the ADG842 available from Analog Devices. This switch is normally closed so that the circuit operates normally in the variable voltage drop mode. The switch may be controlled by the microcontroller in the adapter and changed upon receiving the appropriate wired or wireless command.

Suitable values for the components shown in FIG. 8 are as follows:

TABLE 1

$R_f$ = resistance of fuse (~2 ohms)
$R_1$ = 5 ohms
$R_b$ = 12.1 kohms
RF = 232 kohms
$R_3$ = 332 Kohms
$R_4$ = 187 Kohms
$R_5$ = 35.7 kohms
160 = LMP2231 (National Semiconductor)
162 = TC1035 (Microchip Technology Inc.)
$V_{ref}$ = 0.34 volts
DC/DC converter = TPS61070 (Texas Instruments)

Figure 9:
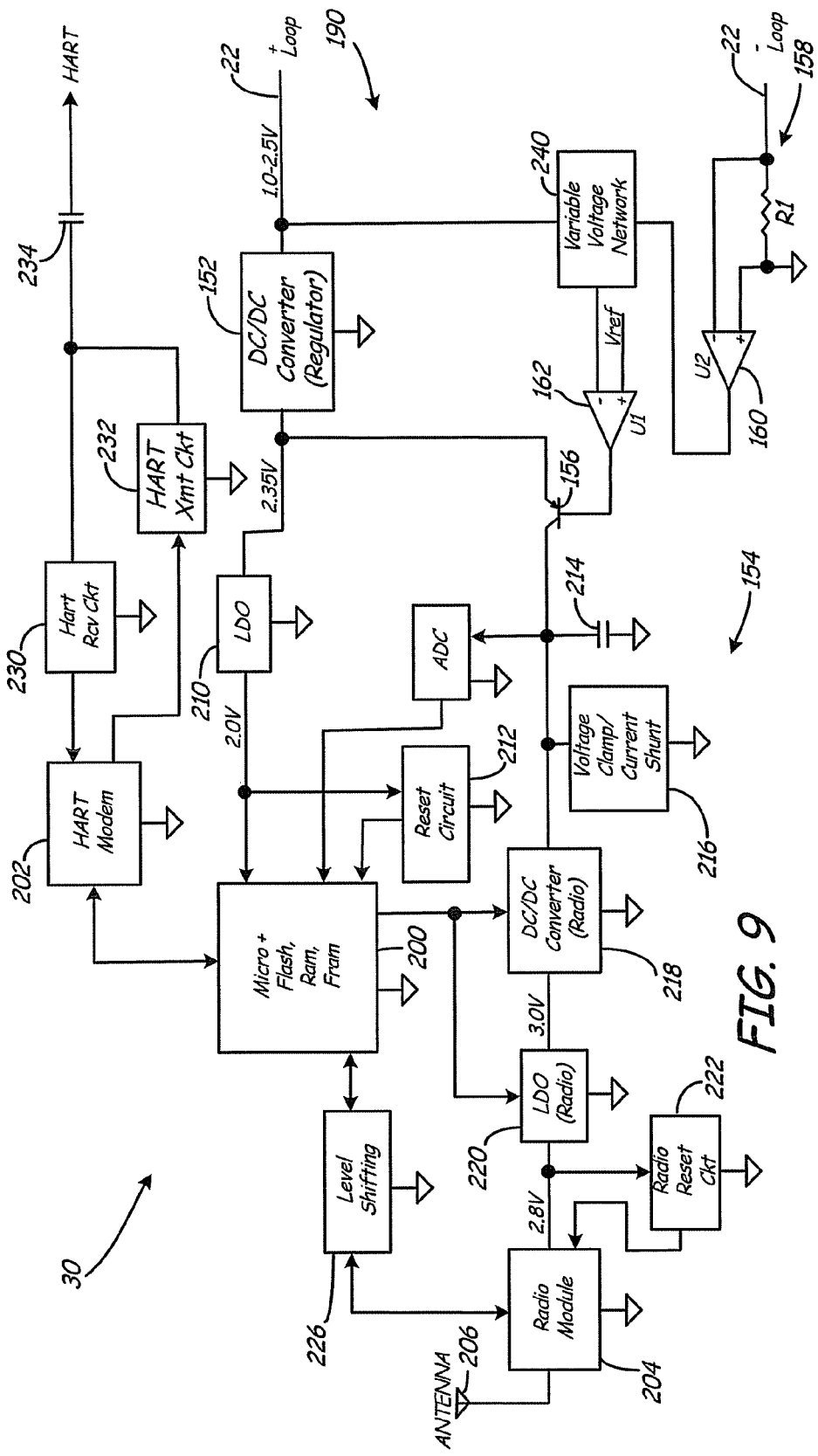
FIG. 9 is a simplified block diagram showing components of a wireless adapter having a variable voltage drop circuit.

FIG. 9 is a schematic diagram of circuitry of adapter 30 shown in block diagram format including variable loop voltage drop circuitry 190. Adapter 30 includes a microprocessor 200 having an internal memory which is configured to control operation of the device and communicate using, for example, the HART® communication protocol over the process control loop 22 using a HART® modem 202. A radio communication module 204 is provided for wireless communications using an antenna 206. The microprocessor 200 is powered by an LDO (Low Dropout Regulator) 210 which is coupled to the output from DC to DC converter 152. A reset circuit 212 is provided to reset microprocessor 200 should the voltage drop below a desired operating point. In this configuration, the shunt regulator 154 is illustrated as a number of components. A capacitor 214 is shown having a value of 10,000 µF which is used to store power for use in operating radio module 204. A voltage clamp/current shunt 216 is provided to set the maximum voltage across capacitor 214. A DC to DC switching regulator 218 is used to provide a regulated three volt output to LDO 220 which provides power to the radio module 204. A reset circuit 222 is provided to reset the radio module 204 if the voltage drops below a desired threshold. A level shift circuit 226 is provided for coupling communication signals between the radio module 204 and the microprocessor 200. HART® modem 202 receives HART® communication signals from the HART® connection using HART® receive circuit 230 and transmits HART® communication signals using HART® transmit circuit 232. These circuits are coupled to the HART® terminal through a capacitor 234. In FIG. 9, a variable voltage network 240 is provided and couples between the +Loop terminal and the output of OpAmp 160. The variable voltage network 240 comprises resistors $R_3$, $R_4$ and $R_5$ shown in FIG. 7. (Note that in this simplified illustration resistors $R_b$, $R_f$ and RF are not shown).

The present invention provides a field device and/or adapter configured to couple to a process control loop which further includes a wireless communication module for one way or bi-directional wireless communication. The wireless communication module can transmit and/or receive an RF signal from a remote device or location. The module can be directly powered with power received from the two-wire process control loop, or can be powered with power received from the process control loop and stored for subsequent use. The module can be a removable module in which the module need only couple to those field devices in which wireless communication is desired. The module can be configured as an adapter to retrofit an existing transmitter.

The above configuration provides an adapter which enables wireless communication with a process variable transmitter. The circuitry can be configured to operate from power which is already available to the process variable transmitter. Increased efficiency can be obtained by placing the energy storage element as a shunt element in a loop shunt regulator. A "step up" regulator can be provided which is part of the feedback circuit for the shunt regulator control. This configuration increases efficiency while reducing the number of components required. The voltage drop across the device can be varied as desired.

The term "field device" as used herein can be any device which is used in a process control monitoring system and does not necessarily require placement in the "field." The device can be located anywhere in the process control system including in a control room or control circuitry. The terminals used to connect to the process control loop refer to any electrical connection and may not comprise physical or discrete terminals. Any appropriate radio frequency communication circuitry can be used as desired as can any appropriate communication protocol, frequency or communication technique. The power supply circuitry is configured as desired and is not limited to the configurations set forth herein. In some embodiments, the field device includes an address which can be included in any RF transmissions such that the device can be identified. Similarly, such an address can be used to determine if a received signal is intended for that particular device. However, in other embodiments, no address is utilized and data is simply transmitted from the wireless communication circuitry without any addressing information. In such a configuration, if receipt of data is desired, any received data may not include addressing information. In some embodiments, this may be acceptable. In others, other addressing techniques or identification techniques can be used such as assigning a particular frequency or communication protocol to a particular device, assigning a particular time slot or period to a particular device or other techniques. Any appropriate communication protocol and/or networking technique can be employed including token-based techniques in which a token is handed off between devices to thereby allow transmission or reception for the particular device.

Although the present invention has been described with reference to preferred embodiments, workers skilled in the art will recognize that changes may be made in form and detail without departing from the spirit and scope of the invention. As used herein, Radio Frequency (RF) can comprise electromagnetic transmissions of any frequency and is not limited to a particular group of frequencies, range of frequencies or any other limitation. Any communication protocol can be used, as desired, including IEEE 802.11b, 802.15.4, or other protocols, including proprietary protocols as well as standardized protocols such as the wireless HART® communication protocol. In the discussion above, the wireless adapter provides a digital signal communication connection for coupling to the two-wire process control loop and, in some embodiments, communicating in accordance with the HART® communication protocol. The adapter can be configured to mount externally to a process control transmitter, for example, through a threaded coupling to NPT fittings in the transmitter housing. In the above discussion, when a capacitor which is not a super capacitor is employed, for example on the order of 10,000 µF is used to store energy, the intrinsic safety circuitry of the present invention operates to limit the maximum available energy which is entering the circuitry of the adapter. This is because in accordance with intrinsic safety standard, the voltage across a given capacitance must be kept below a level that could result in the capacitance creating a spark if an instantaneous short circuit occurred. Thus, in the above discussion, by limiting the maximum circuit voltage which can be received by circuitry in the adapter, the size of the capacitance can be increased. As used herein, "shunt regulator" is not limited to the particular configurations shown and may comprise any type of circuitry in the adapter in which current is ultimately (and substantially) shunted back to the two-wire process control loop. More generally, this can comprise shunt circuitry which is used to power wireless communication circuitry. Current flowing through the shunt circuitry is returned (shunted) to the two-wire process control loop. Although the present invention has been described with reference to preferred embodiments, workers skilled in the art will recognize that changes may be made in form and detail without departing from the spirit and scope of the invention.

What is claimed is:

1. A wireless adapter for use in a two-wire process control loop configured to couple to a process field device in an industrial process control system coupled to the two-wire process control loop and provide wireless communication to the process field device, comprising:
    wireless communication circuitry;
    first and second loop terminals configured to couple in series with the two-wire process control loop and a process variable transmitter the first and second loop terminals carrying a loop current therebetween, the loop current powering the wireless adapter and carrying information;
    a switching regulator having a switching regulator input coupled to the first loop terminal and an output;
    a shunt regulator coupled to the output of the regulator configured to provide power to the wireless communication circuitry; and
    a feedback circuit configured to control current flowing from the switching regulator to the shunt regulator as a function of a loop current flowing through the two-wire process control loop as measured through at least one of the first and second terminals wherein the feedback circuit is configured to control a voltage drop across the first and second terminals.

2. The apparatus of claim 1 wherein the shunt regulator includes a voltage regulator.

3. The apparatus of claim 2 wherein the voltage regulator comprises a DC to DC converter.

4. The apparatus of claim 1 wherein the shunt regulator includes a capacitor configured to receive charge from the two-wire process control loop and provide power to the wireless communication circuitry.

5. The apparatus of claim 1 wherein the feedback circuitry includes an input which is used to control the voltage drop across the first and second terminals.

6. The apparatus of claim 1 wherein the feedback circuit includes a transistor which is used to couple the shunt regulator to the switching regulator.

7. The apparatus of claim 6 wherein the feedback circuitry controls operation of the transistor to thereby control a voltage drop across the first and second loop terminals.

8. The apparatus of claim 1 wherein the feedback circuitry measures a current flowing from the loop and through the switching regulator.

9. The apparatus of claim 8 wherein the feedback circuitry controls power delivered to the shunt regulator as a function of the sensed current.

10. The apparatus of claim 5 wherein the input is coupled to a microcontroller.

11. The apparatus of claim 1 wherein one of the first and second loop terminals couples to the process field device and further including a communication terminal which couples to the process field device and is used to communicate with the process field device.

12. The apparatus of claim 1 wherein the two-wire process control loop comprises a 4-20 mA current loop.

13. The apparatus of claim 1 wherein the feedback circuitry is switchable between a first mode of operation in which a voltage drop across the first and second terminals is variable and a second mode of operation in which a voltage drop across the first and second terminals is fixed.

14. The apparatus of claim 1 wherein the regulator comprises a DC to DC regulator.

15. A method of providing wireless communication to a process field device coupled to a two-wire process control loop using a wireless adapter, comprising:
    coupling first and second loop terminals of the wireless adapter to the two-wire process control loop and in series with a process variable transmitter, the first and second loop terminals carrying a loop current therebetween, the loop current powering the wireless adapter and carrying information;
    generating a regulated output with a regulator in the wireless adapter coupled to the first loop terminal;
    providing power to wireless communication circuitry in the adapter using shunt regulator which is coupled to the regulated output of the regulator and thereby providing power to the wireless communication circuitry;

communicating wirelessly using the wireless communication circuitry; and adjusting the current flowing from the regulator to the shunt regulator as a function of a loop current flowing through the two-wire process control loop as measured through at least one of the first and second terminals and thereby controlling a voltage drop across the first and second loop terminals.

16. The method of claim 15 wherein the regulator comprises a switching voltage regulator.

17. The method of claim 15 including charging a capacitor with charge from the two-wire process control loop.

18. The method of claim 15 including measuring a current flowing from the loop terminal into the adapter and responsively controlling the voltage drop across the first and second terminals.

19. The method of claim 15 wherein one of the first and second loop terminals couples to the process field device and further including coupling a communication terminal to the process field device for use in communicating with the process field device.

20. The method of claim 15 wherein the two-wire process control loop comprises a 4-20 mA current loop.

21. The method of claim 15 wherein the two-wire process control loop carries digital communication in accordance with the HART® communication protocol.

* * * * *